United States Patent [19]
Anglin et al.

[11] Patent Number: 5,475,834
[45] Date of Patent: Dec. 12, 1995

[54] INTEGRATION OF MIGRATION LEVEL TWO AND BACKUP TAPE PROCESSING USING MULTIPLE INVENTORY ENTRIES

[75] Inventors: Matthew J. Anglin; William W. Chow, both of Tucson, Ariz.; Robert M. Nugent, Nichols; James M. Showalter, Endicott, both of N.Y.; Gregory J. Tevis; Donald P. Warren, Jr., both of Tucson, Ariz.

[73] Assignee: International Business Machines Corporation, Armonk, N.Y.

[21] Appl. No.: 966,210

[22] Filed: Oct. 26, 1992

[51] Int. Cl.⁶ .................................................. G06F 17/30
[52] U.S. Cl. .................... 395/600; 395/444; 395/488; 364/DIG. 1; 364/243; 364/243.2; 364/246; 364/268.2; 364/282.1; 364/282.2
[58] Field of Search .................................. 395/425, 600, 395/575

[56] References Cited

U.S. PATENT DOCUMENTS

| | | | |
|---|---|---|---|
| 4,084,231 | 4/1978 | Capozzi et al. | 395/425 |
| 4,429,363 | 1/1984 | Duke et al. | 395/250 |
| 4,771,375 | 9/1988 | Beglin et al. | 395/425 |
| 4,875,155 | 10/1989 | Iskiyan et al. | 395/425 |
| 4,945,475 | 7/1990 | Bruffey et al. | 395/600 |
| 4,974,156 | 11/1990 | Harding et al. | 395/425 |
| 5,018,060 | 5/1991 | Gelb et al. | 395/600 |
| 5,239,647 | 8/1993 | Anglin et al. | 395/600 |
| 5,276,867 | 1/1994 | Kenley et al. | 395/600 |
| 5,317,728 | 5/1994 | Tevis et al. | 395/600 |
| 5,367,698 | 11/1994 | Webber et al. | 395/800 |

OTHER PUBLICATIONS

"BUMP" *The BRL/USNA Migration Project*, by Muuss et al, US Army Ballistic Research Laboratory, Mar. 5, 1989, pp. 1–19 and FIGS. (1–3).

"An Efficient Application of Disk Storage to the DRCS Data Migration Scheme" by Gwatking, Dept of Defence Technical Report, Apr. 1978.

*Primary Examiner*—Paul V. Kulik
*Attorney, Agent, or Firm*—Baker, Maxham, Jester & Meador

[57] ABSTRACT

A method and system for integrating migration level two (ML2) and backup tape processing provide for the backup, archival, and/or restoration of ML2 tape files without the use of tape mounts. In this manner, the amount of data movement required to recover from data loss is significantly reduced. Tape files may be recovered to their original status, even if the file has migrated to ML2. The status of the data is preserved after such a recovery operation. In this manner, data movement is reduced because no remigration of data is required after a recovery.

17 Claims, 23 Drawing Sheets

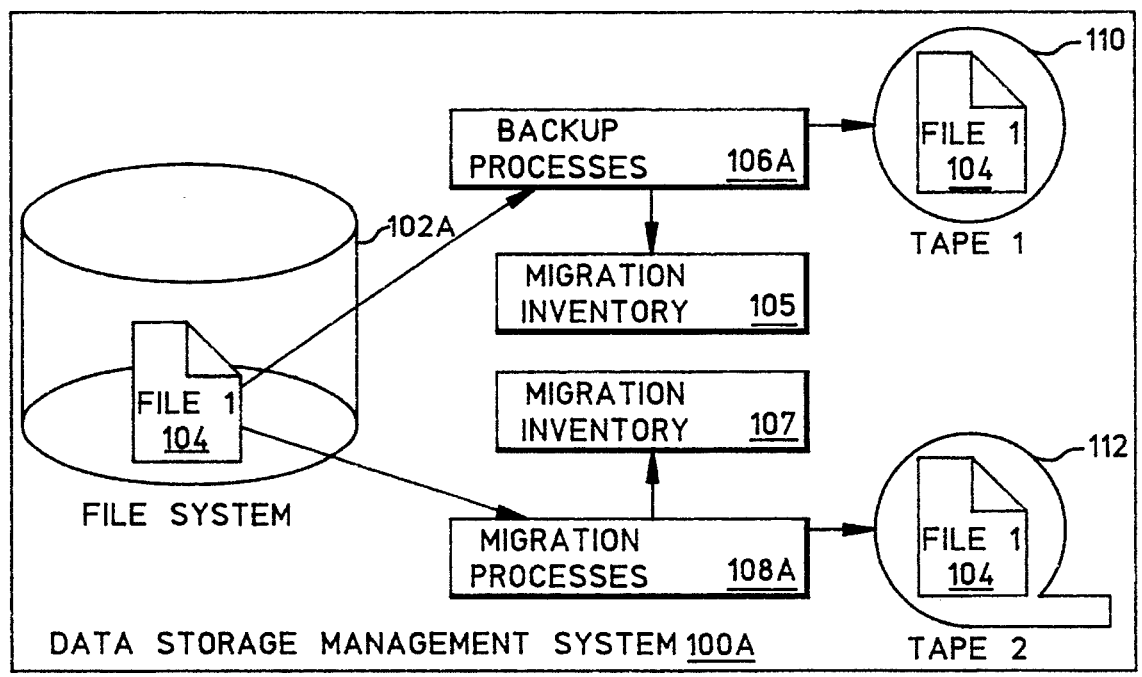
PRIOR ART  FIG. 1A
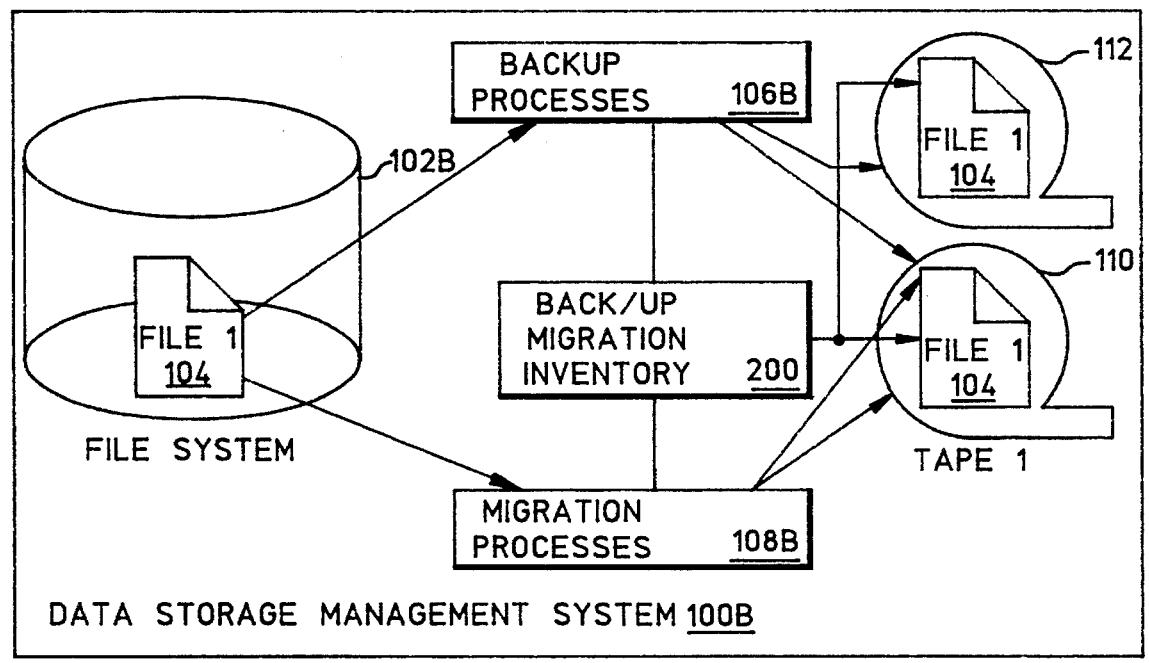
INVENTION  FIG. 1B

Action: File is migrated
Description: Migrated file

| Object type | FP | OID | DOBI | TOBU | SCID | TID | Data |
|---|---|---|---|---|---|---|---|
| migrate | f1 | o1 | d1 | – | sd1 | td1 | – |
| DOB dl | | | | – | – | – | data1 |

*FIG. 9A*

Action: File is backed up
Description: Migrated file with one backup

| Object type | FP | OID | DOBI | TOBU | SCID | TID | Data |
|---|---|---|---|---|---|---|---|
| migrate | f1 | o1 | d1 | – | sd1 | td1 | – |
| DOB dl | – | – | – | – | – | – | data1 |
| backup | f1 | o1 | d1 | t1 | sd1 | td1 | – |

*FIG. 9B*

Action: File is backed up again
Description: Migrated file with 2 backups

| Object type | FP | OID | DOBI | TOBU | SCID | TID | Data |
|---|---|---|---|---|---|---|---|
| migrate | f1 | o1 | d1 | – | sd1 | td1 | – |
| DOB dl | – | – | – | – | – | – | data1 |
| backup | f1 | o1 | d1 | t1 | sd1 | td1 | – |
| backup | f1 | o1 | d1 | t2 | sd1 | td1 | – |

*FIG. 9C*

Backup copies as old or older than TOBU t1 are deleted
Description: Migrated file with backup

| Object type | FP | OID | DOBI | TOBU | SCID | TID | Data |
|---|---|---|---|---|---|---|---|
| migrate | f1 | o1 | d1 | – | sd1 | td1 | – |
| DOB dl | – | – | – | – | – | – | data1 |
| backup | f1 | o1 | d1 | t2 | sd1 | td1 | – |

*FIG. 9D*

Action: File is renamed then backed up again (no recall)
Description: Migrated file with 2 backups under different names

| Object type | FP | OID | DOBI | TOBU | SCID | TID | Data |
|---|---|---|---|---|---|---|---|
| migrate | f1 | o1 | d1 | – | sd1 | td1 | – |
| DOB dl | – | – | – | – | – | – | data1 |
| backup | f1 | o1 | d1 | t2 | sd1 | td1 | – |
| backup | f1 | o1 | d1 | t3 | sd1 | td1 | – |

*FIG. 9E*

Action: File is erased
Description: file with 2 backups under
different names

| Object type | FP | OID | DOBI | TOBU | SCID | TID | Data |
|---|---|---|---|---|---|---|---|
| DOB d1 | — | — | — | — | — | — | data1 |
| backup | f1 | o1 | d1 | t2 | sd1 | td1 | — |
| backup | f1 | o1 | d1 | t3 | sd1 | td1 | — |

*FIG. 9F*

Action: File is restored with TOBU t2 to same
filepool and SG with FILEPOOL FILELOAD.
Description: migrated file with 2 backups under
different names

| Object type | FP | OID | DOBI | TOBU | SCID | TID | Data |
|---|---|---|---|---|---|---|---|
| DOB d1 | — | — | — | — | — | — | data1 |
| backup | f1 | o1 | d1 | t2 | sd1 | td1 | — |
| backup | f1 | o1 | d1 | t3 | sd1 | td1 | — |
| migrate | f1 | o2 | d1 | — | sd2 | td2 | — |

*FIG. 9G*

Action: all backup copies are deleted (delete as old
or older than TOBU t3)
Description: migrated file

| Object type | FP | OID | DOBI | TOBU | SCID | TID | Data |
|---|---|---|---|---|---|---|---|
| DOB dl | — | — | — | — | — | — | data1 |
| migrate | f1 | o2 | d1 | — | sd2 | td2 | — |

*FIG. 9H*

Action: file is erased
Description: data are gone

| Object type | FP | OID | DOBI | TOBU | SCID | TID | Data |
|---|---|---|---|---|---|---|---|
| — | — | — | — | — | — | — | — |

*FIG. 9I*

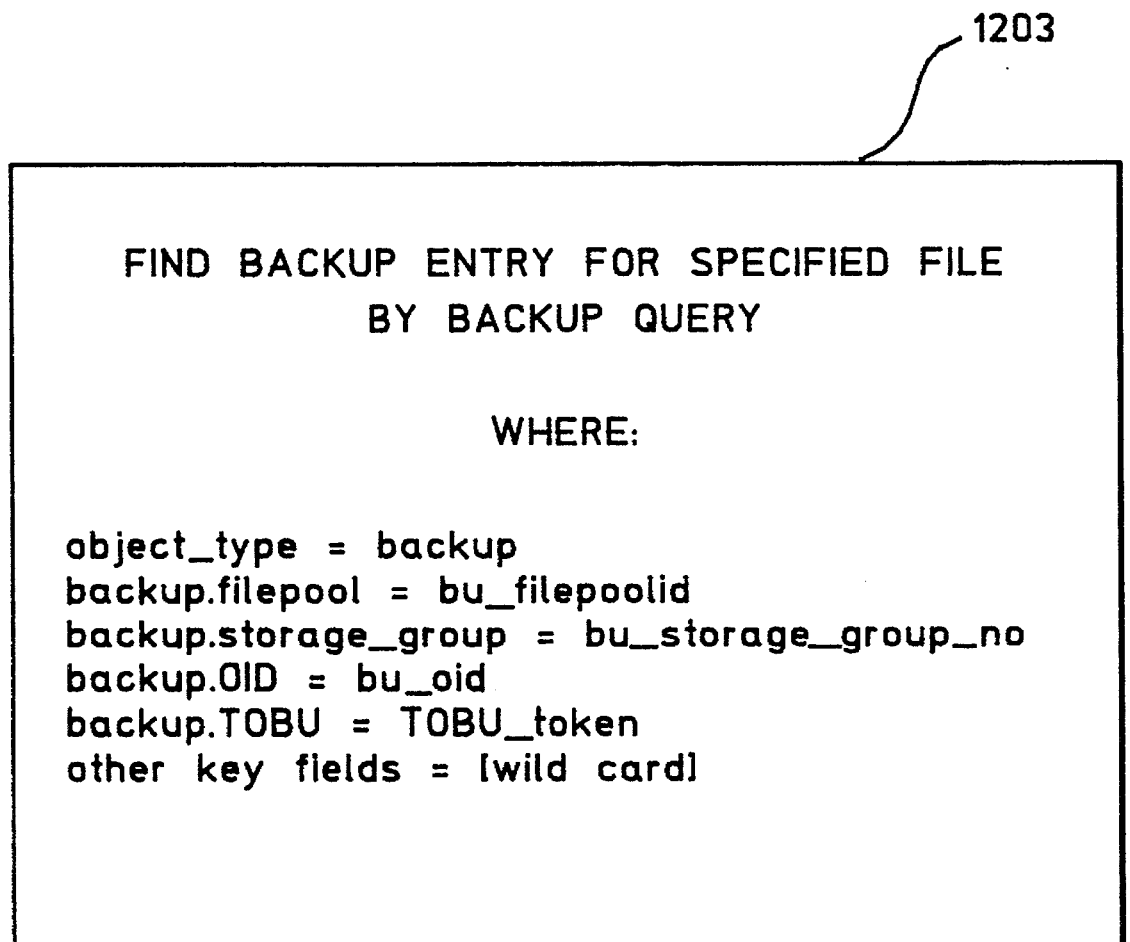
FIG. 12A

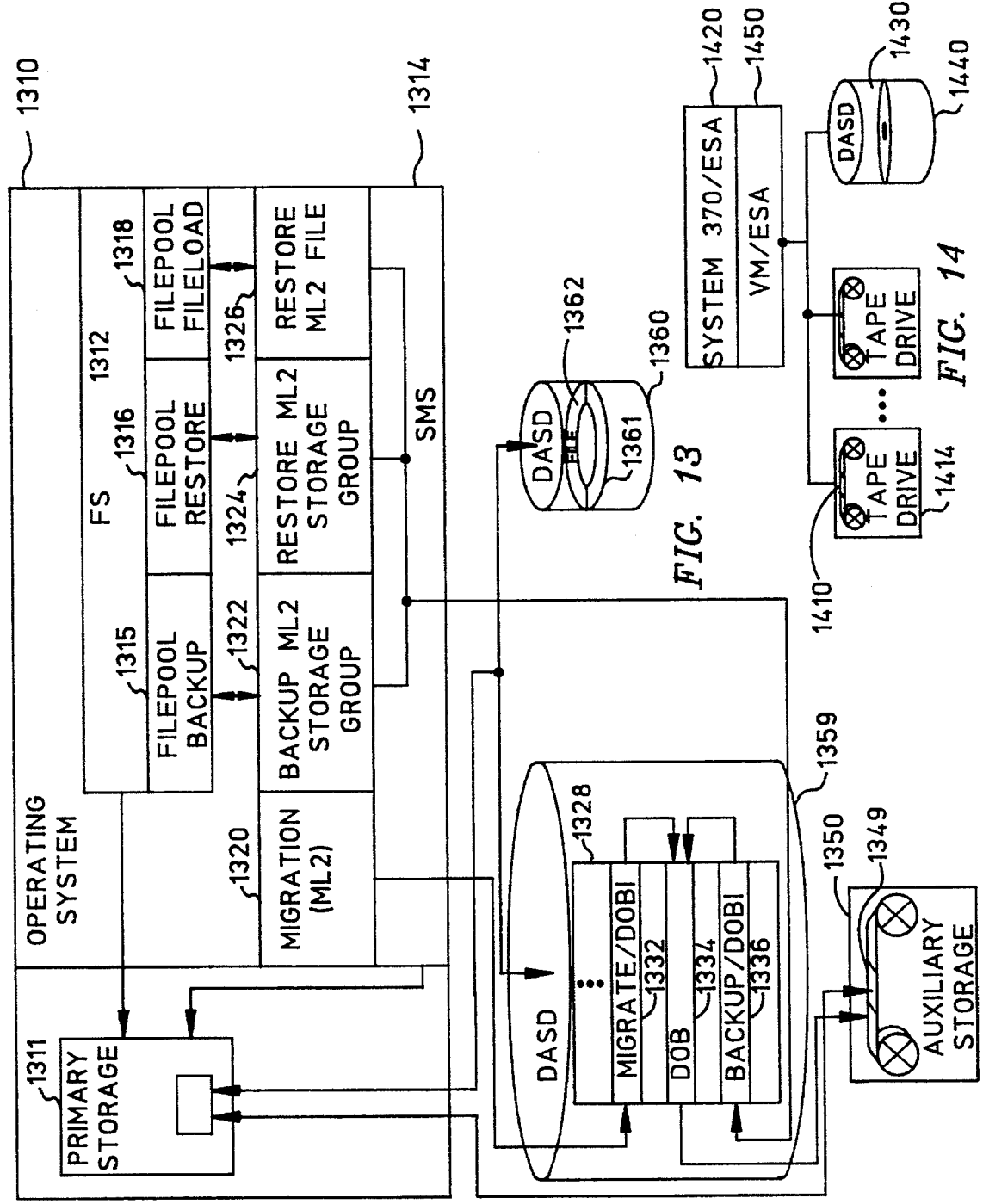

INTEGRATION OF MIGRATION LEVEL TWO AND BACKUP TAPE PROCESSING USING MULTIPLE INVENTORY ENTRIES

BACKGROUND OF THE INVENTION

1. Field of the Invention

This invention relates generally to computer data storage management, and more specifically to techniques for the backup, archiving, recovery, and/or restoration of Migration Level Two (ML2) tape files.

2. Description of the Prior Art

Present-day computer data processing systems generally include a host processor having one or more central processing units. The host processor is supported by memory facilities and input/output (I/O) interfaces. One or more buses are often employed to provide interconnections between the various components of a computer data processing system.

The processing units execute instructions which specify the manipulation of data stored within the memory facilities. Therefore, the memory facilities must be capable of storing data required by the processor and transferring that data to the processor at a rate capable of making the overall operation of the computer feasible. The cost and performance of computer memory is thus critical to the commercial success of a computer system.

As computers manipulate ever-increasing amounts of data, they require larger quantities of data storage capacity. A typical data processing system includes both main memory and one or more peripheral storage devices. A data processing system having a plurality of peripheral storage devices arranged hierarchically is referred to as a data storage hierarchy.

In a data storage hierarchy, the term "primary data storage" refers to the data storage level having the highest level of performance and the lowest level of storage capacity. The primary data storage level is oftentimes referred to as "level 0" data storage. Secondary, or level 1, storage includes storage capacity equal to or greater than level 0 storage, but at reduced cost and performance. Similarly, level 2 data storage (also referred to as "auxiliary storage") has lower cost and performance than level 1 storage. However, level two storage includes a storage capacity equal to or greater than level 1 storage. Level two storage is often implemented using magnetic tape data storage drives. Data are accessed from these drives by means of relatively cumbersome mechanical tape mounting operations.

Various techniques have been developed to provide computer file data storage management. Storage management may be defined as the manipulation of a data storage hierarchy to balance system performance, data storage, and cost. A storage management system moves and copies data between different levels of the hierarchy to perform these balancing functions. The manipulation of the hierarchy may involve operations such as the deletion of data which are no longer being used.

Storage management includes several subcomponents, such as performance management, capacity management, space management, and availability management. Each of these subcomponents may involve the transfer of data between different levels of the hierarchy. Space management is the movement of data between different levels of the hierarchy so as to store data only in the most appropriate level of the peripheral storage hierarchy. For example, relatively active data should be stored in a relatively high performance level of the hierarchy, and relatively inactive data should be stored within a relatively low performance, low cost level of the hierarchy.

As data age, they are generally referenced less and less. Since such data are relatively less active, they should be moved to a lower performance level of the data storage hierarchy. The movement of data from one level of a data storage hierarchy to another is referred to as "migration", and may include data compression techniques to conserve data storage space. Transferring a file by migration may include the maintenance of a primary copy of a file in level 0 storage. The primary copy is, however, an empty file. The data in the file have already been transferred to the secondary copy of the file in level 1 storage.

Availability management is the backup of data within a data storage hierarchy to improve the likelihood of the data being available if and when they are needed by the host processor. The original or primary copy off the data is not deleted; an additional copy is generated and transferred to another portion of the data storage hierarchy. The secondary copy is typically stored on a different peripheral storage device from the primary copy to ensure the availability of the data. If the primary copy of the data is rendered unavailable, such as by device failure, the secondary copy of the data may still be referenced. The secondary copy of the data need not be stored in a different level of the data storage hierarchy, but this may nevertheless be desirable because the secondary copy is not likely to be as active as the primary copy.

Storage management has traditionally been performed manually. The owner of the data decides when to migrate or back up data, and where such migrated and backup files should be stored. Such decisions are time consuming, usually requiring a review of each file stored. The operations involved are often so intensive that manual reviews and decisions are not made until there is no alternative. For instance, a system user might not migrate any files to level 1 storage until all storage space in level 0 storage is filled. In large systems, or in any system storing relatively large amounts of data, it is simply impractical to perform manual data storage management.

In recent years, computer software has been developed to provide automated data storage management, thereby reducing the need for manual operations. One example of such a management system is the IBM Data Facility Storage Management Sub-System for Virtual Machines software package, hereinafter referred to as "DFSMS/VM". DFSMS/VM software is available from the International Business Machines (IBM) Corporation of Armonk, N.Y. DFSMS is a trademark of the IBM Corporation.

Systems such as DFSMS/VM commonly provide a function for backing up (archiving) data on a magnetic tape data storage drive. However, a function for optimizing space management on a magnetic tape storage drive is seldom offered. For example, one space management system providing for the migration of data is known as the migration level two (ML2) system. ML2 utilizes magnetic tape data storage drives to provide data storage at a hierarchical position of level 2. ML2 capability has only been offered in a select few software data storage management systems, including the IBM Data Facility Hierarchical Storage Manager system (DFHSM), which is a utility to the IBM Multiple Virtual Storage (MVS) series of software operating systems. DFHSM and MVS are available from the International Business Machines Corporation of Armonk, N.Y.

DFSHM is a trademark of the IBM Corporation.

Although the use of ML2 data management techniques results in enhanced space management efficiency, prior art data management software systems are not without drawbacks. For instance, these software systems require relatively frequent tape mounting operations. Tape mounts are costly in terms of response time and installation resource commitment. As a practical matter, tape mounts must be carefully controlled, and should be avoided if at all possible.

If it is desired to provide a backup copy of data stored in ML2 level, presently existing software requires a tape drive mount to bring the data back into primary storage, and possibly a second tape mount to put the data into a backup repository. Furthermore, prior art software does not provide for any backups of files which have been migrated to tape. Prior art approaches resolve this problem by providing a tape dual copy function for the ML2 physical tape volumes. However, this resolution does not protect against loss of the primary file due to device failure or accidental erasure.

An additional drawback of prior art migration software relates to the recovery of a migrated file. It is undesirable to recover a migrated file to the primary storage area. An attempt to restore data back to the primary storage area may fail, because migration schemes permit the primary storage area to become overcommited. Furthermore, if the primary storage area had not become overcommited, there would have been no reason to migrate the file in the first place.

Prior art migration techniques do not optimally exploit design features which offer the potential for improved performance and simplicity. More specifically, many of the same processing steps are employed to implement the functions of managing the migration inventory/repository and managing the backup inventory/repository. Existing systems effectively execute the same steps twice: once for migration, and once for backup. No existing system attempts to consolidate these steps into a unified, more efficient operation. As a result, the migration and backup repositories are situated on separate tape volumes. Similarly, the migration and backup inventories are also segregated.

Presently-existing methods of performing an archive of a file that is migrated to ML2 tape require numerous processing steps. First, a recall of the file must be accomplished. This requires a tape mount, data movement from the ML2 tape repository back to primary storage, and updating the associated inventory. Next, the data are archived. The step of archiving the data involves three sub-steps. First, another tape mount must be provided. Second, data must be moved in order to place the required data on the archive (or backup) repository. Third, the associated inventory must be updated. After archival, the primary version of data (the version of data previously recalled) is erased.

In view of the foregoing considerations, there is a manifest need for an improved system which integrates Migration Level Two (ML2) and backup tape processing. The system should avoid tape mounts if possible. The system should include provisions for files backed up after the migration process, such that these files map be restored to the migrated state upon recovery. Such a feature is not offered by existing systems because these systems cannot back up migrated files. It would be desirable to have all tape volumes included within one large tape pool, as opposed to having separate tape volumes for the migration repository and the backup repository. It would also be desirable to integrate the migration inventory and the backup inventory. Furthermore, it would be desirable to develop an improved method for performing an archive of a file that is migrated to ML2 tape. Such a method should minimize the amount of data transfer operations and/or the number of tape mounts which are required.

SUMMARY OF THE INVENTION

The invention provides an improved system for integrating migration level two (ML2) and backup tape processing. The system provides for the backup, archival, and/or restoration of ML2 tape files without the use of tape mounts. In this manner, the amount of data movement required to recover from data loss is significantly reduced. The invention provides a function whereby tape files may be recovered to their original status, even if the file had migrated to ML2. The status of the data is preserved after such a recovery operation. In this manner, data movement is reduced because no remigration of data is required after a recovery.

The invention sets forth a novel method for providing enhanced ML2 and backup tape processing. An inventory entry corresponding to a specified migrated file is updated to indicate that the file is archived in addition to migrated. The use of tape mounts is not required. No data movement is involved. Only one inventory update is required, and primary data need not be erased.

BRIEF DESCRIPTION OF THE DRAWINGS

The various features, aspects, and advantages of the present invention will become apparent from the following more particular description thereof, presented in conjunction with the following drawings.

FIG. 1A is a pictorial representation and partial block diagram of a prior art system including migration and backup functions.

FIG. 1B is a pictorial representation and partial block diagram of the basic operational environment of the present invention.

FIGS. 9A–9I set forth specific examples of the manner in which the operational sequences of FIGS. 5, 6A, 6B and 8 may be applied to the data structures of FIGS. 3, 4, and 7.

Figure 2:
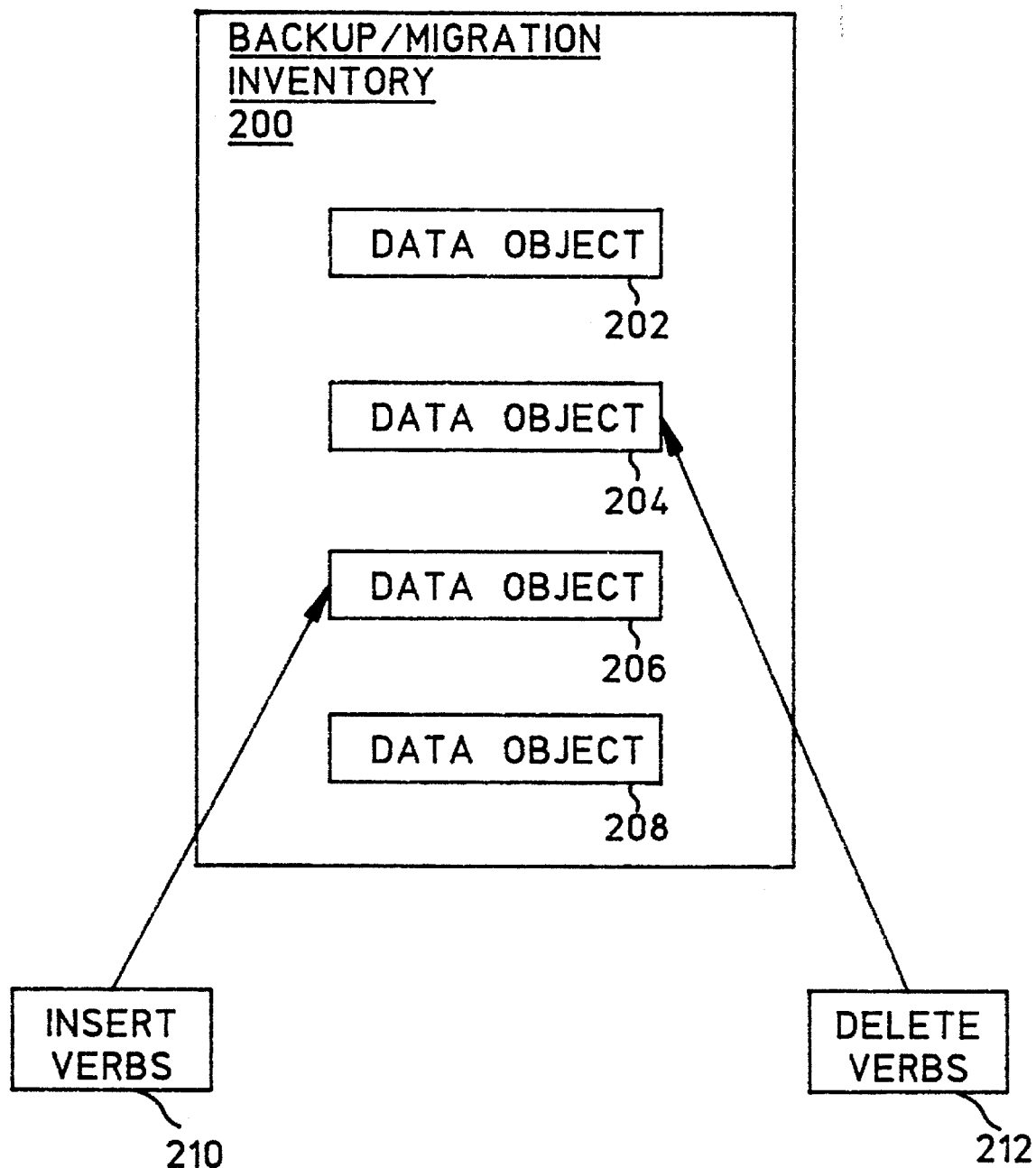
FIG. 2 is a block diagram illustrating an exemplary prior art data structure, each object having a single inventor entry, used in conjunction with data storage management systems.

FIGS. 11A–11E are a flowchart setting forth program flow for a subroutine entitled "restore_ML2_storage_group".

FIGS. 12A–12D are a flowchart setting forth program flow for a subroutine entitled "restore ML2 file".

FIG. 13 is a block diagram illustrating an industrial application of the invention.

FIG. 14 is a block diagram illustrating the invention as executable software in a computer system.

DETAILED DESCRIPTION OF THE PREFERRED EMBODIMENTS

FIG. 1A is a pictorial representation and partial block diagram illustrating the operational environment of a known data storage management system. An example of such a data storage management system 100A is the IBM Data Facility Storage Management Subsystem for Virtual Machines software, hereinafter referred to as DFSMS/VM. (DFSMS is a trademark of the IBM Corporation.) The DFSMS/VM software implements various operational sequences for the purpose of storing and inventorizing data using migration level two (ML2) techniques, as described above in the Background of the Invention.

The data storage management system 100A shown in FIG. 1A (for example, DFSMS/VM) implements various operational sequences for the purpose of storing and inventorizing data. The DFSMS software operates in conjunction with the Virtual Machine (VM) series of operating systems. Although the currently available version of DFSMS/VM software does provide space or availability management, the software provides several improvements to the Virtual Machine (VM) series of operating systems.

A relatively new file system, know as the shared file system, or "SFS", is included in current releases of IBM VM operating systems. (SFS is a trademark of the IBM Corporation). Shared file systems significantly reduce underutilization and fragmentation problems as contrasted with the minidisk file systems (MFS) in common use in various prior art systems. The advantage of SFS is that it allows for the dynamic sharing of peripheral storage space among different users. Physical storage space is not preallocated to a user account as in presently-existing MFS systems. Instead, as each user actually stores a file, storage space is dynamically allocated for that file only. Users are given accounts to a file pool, which may be defined as a collection of files for a set of users.

In VM operating systems, a file pool is comprised of a collection of minidisks owned by a single virtual machine that contains files for a number of users. Each user stores files in a logical file space within a SFS storage group, which is a collection of minidisks within a file pool. The storage space assigned to a file changes dynamically as files are added thereto, deleted therefrom, or updated. The files in each file space may be organized into one or more directories and/or subdirectories, the file space itself representing a top level of the directory hierarchy.

Each data storage management system with data managed by DFSMS/VM has one and only one instance of DFSMS/VM. This instance of DFSMS/VM becomes the DFSMS/VM client. Every client (i.e., every instance of DFSMS/VM) is provided with the capability to manage its own data.

SFS includes control information in level 0 storage as part of every file pool. The control information includes files of information used to locate minidisks in the respective file pool, and to track which blocks of such storage space are in use. The control information also includes a catalog of information about the directories and files in the file pool, such as the owner of each file. Multiple file pools can exist for each instance of DFSMS/VM, each file pool being an instance of SFS.

The data storage management system 100A of FIG. 1A is equipped to perform six major functions. These functions are migration, backup, archive, recall, recovery, and retrieval.

Migration is the movement of data from a first data storage medium to a second data storage medium. The second data storage medium is usually of lower cost and performance that the first medium. The data are migrated in conformance with customer-defined data reference patterns on the media. The migration copy remains the primary (active) version of the data. No explicit action (besides specific reference) is needed to recall a migrated copy of the data.

Backup refers to the copying of data in order to guarantee data availability. A backup copy is an inactive (or second) version of data. The primary (active) copy of data remains unchanged. Explicit action is required to recover a backup copy of data.

Archive is similar to backup, except that the active version of the data is deleted. Explicit action is required to retrieve an archive copy of data.

Recall refers to the restoration of a file that was migrated. Recovery refers to the restoration of a file that was backed up. Retrieval refers to the restoration of a file that was archived.

In FIG. 1A, the data storage management system 100A employs a file system 102A which contains one or more files, such as file 1 (reference 104). The data storage management system includes backup processes 106A and migration processes 108A. The backup and migration processes 106A and 108A use separate inventories. These inventories are the backup inventory 105 and migration inventory 107. In this regard, "inventory" is a data set that describes the contents of an auxiliary storage device. The data set is composed of one or more entries which identify and provide the storage locations of files which are in an auxiliary storage device. An inventory may refer to more than one auxiliary storage device, but, in the prior art, backup inventories refer only to storage devices having backup files, while migration inventories refer only to auxiliary storage devices having migration files. In the prior art, since the backup processes 106A operate independently of the migration processes 108A, the data storage management system 100A creates separate copies of a file (file 1, referred to by reference number 104) on separate auxiliary storage devices such as tape device 1 (reference number 110) and tape device 2 (reference number 112). Not shown, but implicit in FIG. 1A is a requirement to provide a separate inventory and auxiliary storage device for archiving processes.

FIG. 1B illustrates the present invention in several embodiments. All embodiments of the invention include a storage management system 100B, a file system 102B, backup processes 106B, and migration processes 108B. These components correspond with the similarly numbered components in FIG. 1A, with additional functions necessary to practice the invention. All embodiments of the invention also employ a single inventory 200 which serves to describe the contents of auxiliary storage for migration, backup and archiving.

The most efficient embodiment of the invention employs a single physical copy of file 1 (reference number 104) for all auxiliary storage purposes including migration, backup and archiving. For example, if file 1 is already migrated when the backup process 106B runs, the backup process 106B merely adds an inventory entry to the inventory 200 which points to the auxiliary storage location of file 1 for all auxiliary storage purposes denoted in the inventory. Similarly, if file has been backed up before the migration process 108B runs, the migration process merely adds an inventory entry pointing to the auxiliary storage location of file 1, which was stored there by the backup process 106B. This implies that only a single auxiliary storage means needs to be provided for all auxiliary storage purposes.

In the most conservative embodiment of the invention, when Separate copies of data are deemed necessary for the separate auxiliary storage purposes, separate, dedicated auxiliary storage devices such as tape device 1 and tape device 2 (110, 112, respectively) may be provided for those purposes. Of course, if the storage management system 100B is to provide the full complement of auxiliary storage functions and the data storage management control procedure requires storage of the copies on separate physical media, the system configuration would require either a mount/demount procedure to provide separate physical media on a single auxiliary storage device, or a number of separate auxiliary storage devices as there are auxiliary storage purposes in the storage scheme of the system.

FIG. 2 illustrates an example of an inventory data structure which may be used in conjunction with the data storage management system 100B of FIG. 1B to perform data storage management using migration level two (ML2) techniques. The operational sequences used by the system 100B to practice the invention utilize the backup/migration inventory 200. These operational sequences may use functions found in the "workstation data save facility" (WDSF) available by the assignee of this application. (WDSF is a trademark of IBM Corporation, the assignee of this application). As is known, workstation data save facility functions provide for client-interactive data storage management by means of interfaces called "verbs".

One function of verb interfaces is to create data objects 202, 204, 206, 208. Verbs employed for this purpose are referred to as "insert verbs" 210. The insert Verb 210 creates a data object 206 by placing an entry into the inventory 200 and storing the associated data on tape. If it is desired to delete a data object 204, a "delete verb" 212 is used to accomplish this function.

The use of insert verbs 210 and delete verbs 212 to create and destroy data objects. 202, 204, 206, 208 provides a relatively straightforward approach to data storage management. Such an approach is highly useful for systems where the user is only concerned with retaining ML2 data for the purpose of later data recall.

Figure 3:
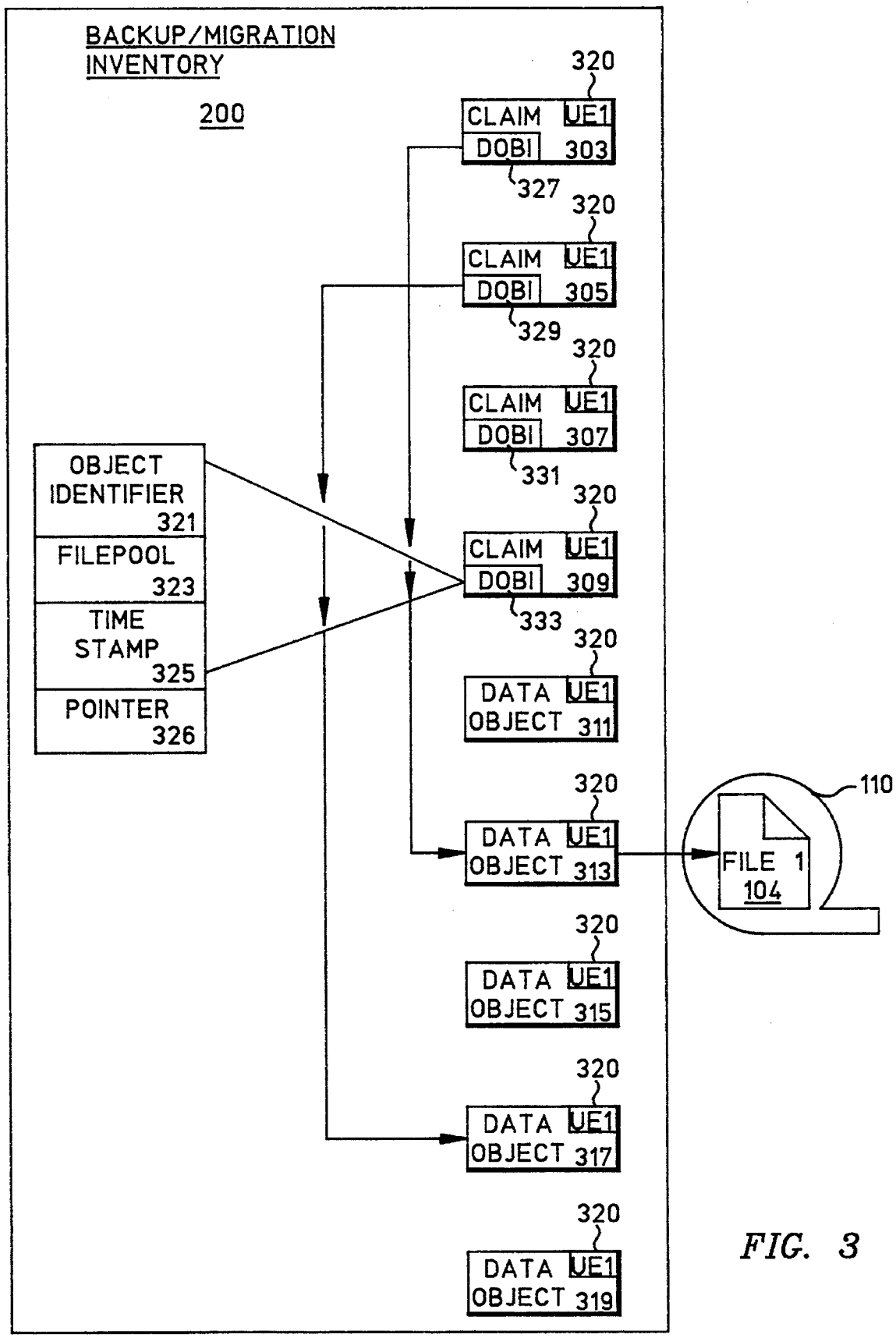
FIG. 3 is a block diagram illustrating the data structure for a backup/migration inventory used in conjunction with a preferred embodiment of the present invention.

With reference now to FIG. 3, the data management system of the present invention offers an enhanced technique for data retention which is employed in the context of data restoration and/or retrieval. The invention provides migration, archive and/or backup processes with data constructs termed "claims" 303, 305, 307, 309. Each claim 303, 305, 307, 309 is represented by an entry in backup/migration inventory 200 corresponding to associated data objects 311, 313, 315, 317, 319. A given data object 311, 313, 315, 317,319 will only be retained for so long as there are claims (inventory entries) 303, 305, 307, 309 associated with it. When the last claim (inventory entry) 303, 305, 307, 309 associated with a given data object 311, 313, 315, 317, 319 is deleted, the data object 311, 313, 315, 317, 319 will be deleted as well. A migration, backup or archive process, such as, for example, the filepool backup process described below, will create its own claim (inventory entry) 303, 305, 307, 309 to the data objects 311, 313, 315, 317, 319.

Claims (inventory entries) 303, 305, 307, 309 are related to data objects 311, 313, 315, 317, 319 through the use of unique data object identifiers (DOBI's) 327, 329, 331, 333 which point to inventory data objects. Each DOBI 327, 329, 331, 333 must satisfy the requirement of being unique with respect to all other DOBIs 327, 329, 331, 333 corresponding to the client associated with the specified data object 311, 313, 315, 317, 319.

The present invention provides an improved data construct for the DOBI's 327, 329, 331, 333. According to the present invention, DOBI's 327, 329, 331, 333 are structured to include a unique object identifier (OID) 321 of an original file, a filepool name 323 identifying the pool containing the original file, a time stamp 325 indicative of the time of creation of a data object identified by the DOBI, and a pointer 326 to the data object. As previously stated, each system with data managed by DFSMS/VM has only one instance of DFSMS/VM. Accordingly, if a given filepool of a given system is considered, the unique object identifier 321 for a migrated file is guaranteed to be unique at any given moment in time. In a similar manner, the DOBI 327, 329, 331, 333 is also guaranteed to be unique.

An alternate embodiment of the invention employs the data object identifier (DOBI) 327, 329, 331, 333 in a novel manner. In this approach, the data object identifier 327, 329, 331, 333 is created from a unique entry identifier (UEI) 320 assigned to any inventory entry 303, 305, 307, 309, 311, 313, 315, 317, 319 by the backup/migration inventory 200. In the invention, more than one claim (inventory entry) 303, 305, 307, 309 can be created with the same DOBI 327, 329, 331, 333 referencing the same data object 311, 313, 315, 317, 319. When a data object 311, 313, 315, 317, 319 is pointed to by a plurality of claims (inventory entries) 303, 305, 307, 309, these additional claims 303, 305, 307, 309 provide access to the same data for different purposes. The multiple entries design of the present invention offers the capability of supporting several different types of claims 303, 305, 307, 309, including migrate entries, backup entries, and archive entries.

To complete the description of the inventory 200 in FIG. 3, each data object points to an auxiliary data storage location where a file is located. This provides a complete trail from a claim to a stored file. For example, assume in claim 303 that the DOBI 327 in its object identifier field identifies file 1 and points to the data object 313. The data object 313, in turn, points to the auxiliary storage location where file 1 is stored, which may be accessed for recall, recovery, or restoration by way of the auxiliary storage device 110.

The data storage management system includes a function which instructs backup/migration inventory 200 server functions to delete one of a plurality of claims 303, 305, 307, 309 (inventory entries) from the backup/migration inventory 200. When the last remaining claim 303, 305, 307, 309 (inventory entry) corresponding to a particular data objects 311, 313, 315, 317, 319 is deleted, the data object itself is also deleted. Accordingly, a valid data object 311, 313, 315, 317, 319 will always be associated with at least one claim 303, 305, 307, 309 (inventory entry). The backup/migration inventory 200 can be searched for all of the claims (inventory entries) 303, 305, 307, 309 associated with a particular data object 311, 313, 315, 317, 319 because they are all related by the same data object identifier (DOBI) 327, 329, 331, 333.

Figure 4:
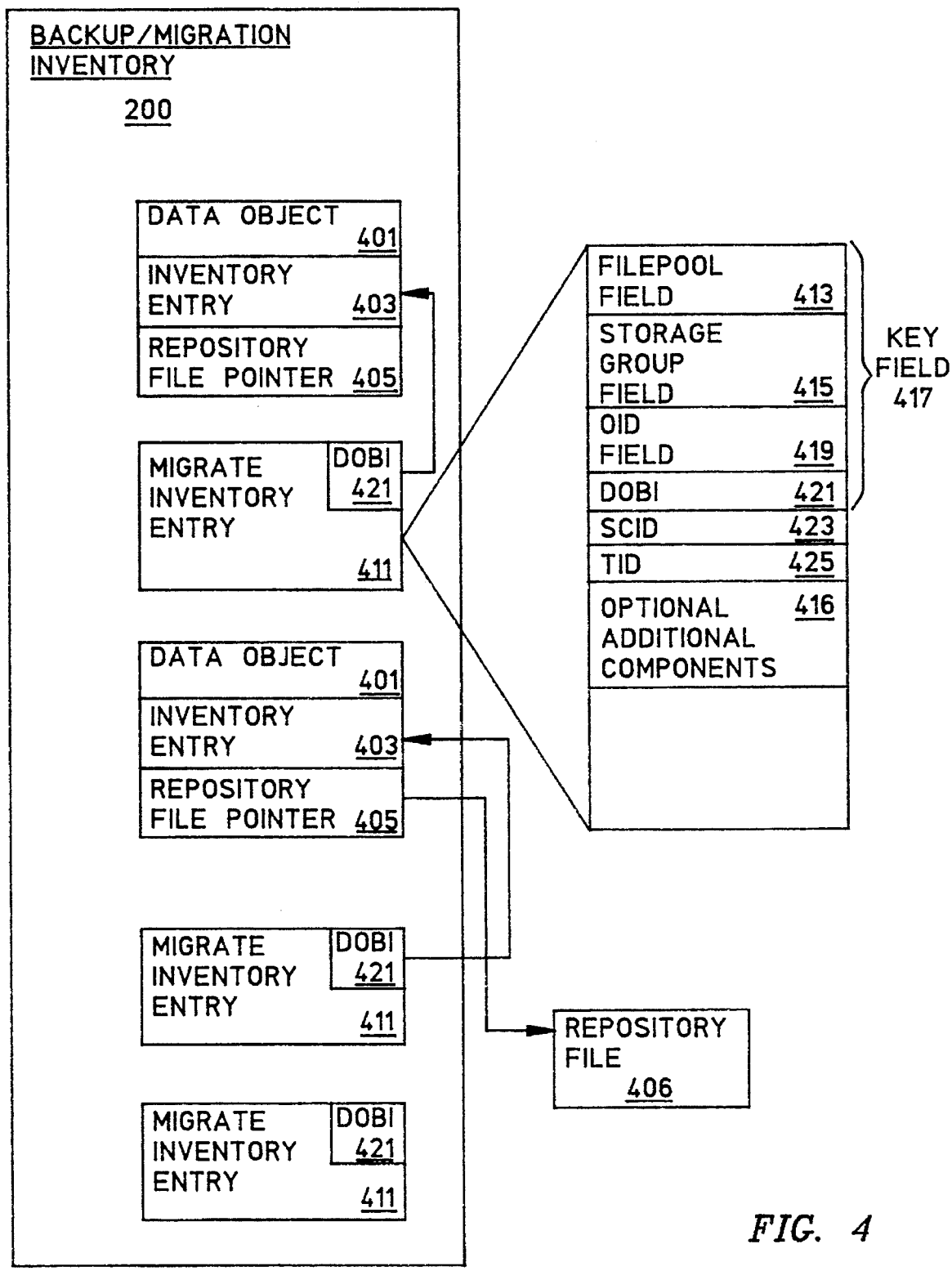
FIG. 4 is a block diagram illustrating an exemplary data structure for a backup/migration inventory fused in conjunction with a preferred embodiment of the present invention.

FIG. 4 illustrates the data structure for a multiple entries embodiment of the present invention as applied to the task of migrating files to ML2. When a file is migrated to ML2, the data storage management system 100B creates two software objects in the backup/migration inventory 200 by means of an insert verb 210 (FIG. 2). The first object is a data object 401 which includes inventory entries 403 and respository file pointers 405, which point to respository files 406. The repository files pointed to by the data object. 401 include the actual file data stored on tape.

The second software object created by the data storage management system 100B for file migration is a migrate inventory entry 411. The entry 411 may include any of the following six components, as well as various optional additional components 416 if desired. The first component is a filepool field 413, which is the filepool of the file being migrated. The second component is a storage group field 415, which is the storage group of the file being migrated. The storage group field 415 is used to locate the migrate inventory entry 411 in order to establish the backup entry during filepool backup. Note that the storage group field 415 is actually a part of the OID field 419 to be described below, and also part of the key field 417. The third component is an OID field 419, which relates the migrate inventory entry 411 to the file whose data is being migrated to ML2. The fourth component is called a "data object identifier" (DOBI) 421. The DOBI 421 relates data objects 401 to migrate inventory entries 411. More specifically, the DOBI 421 relates the migrate inventory entry 411 to the data object 401 that contains the actual file data in its repository file 406. The four components 413, 415, 419 and 421 together form a field which may be termed the "key field" 417.

The fifth and sixth components are not within the key field 417. The fifth component is a sequential change identifier (SCID) 423 used to provide added assurance that the OID field 419 is related to the proper file. The sixth component is a table identifier (TID) field 425 used to speed up the catalog search for the desired OID field 419 during a file recall.

Figure 5:
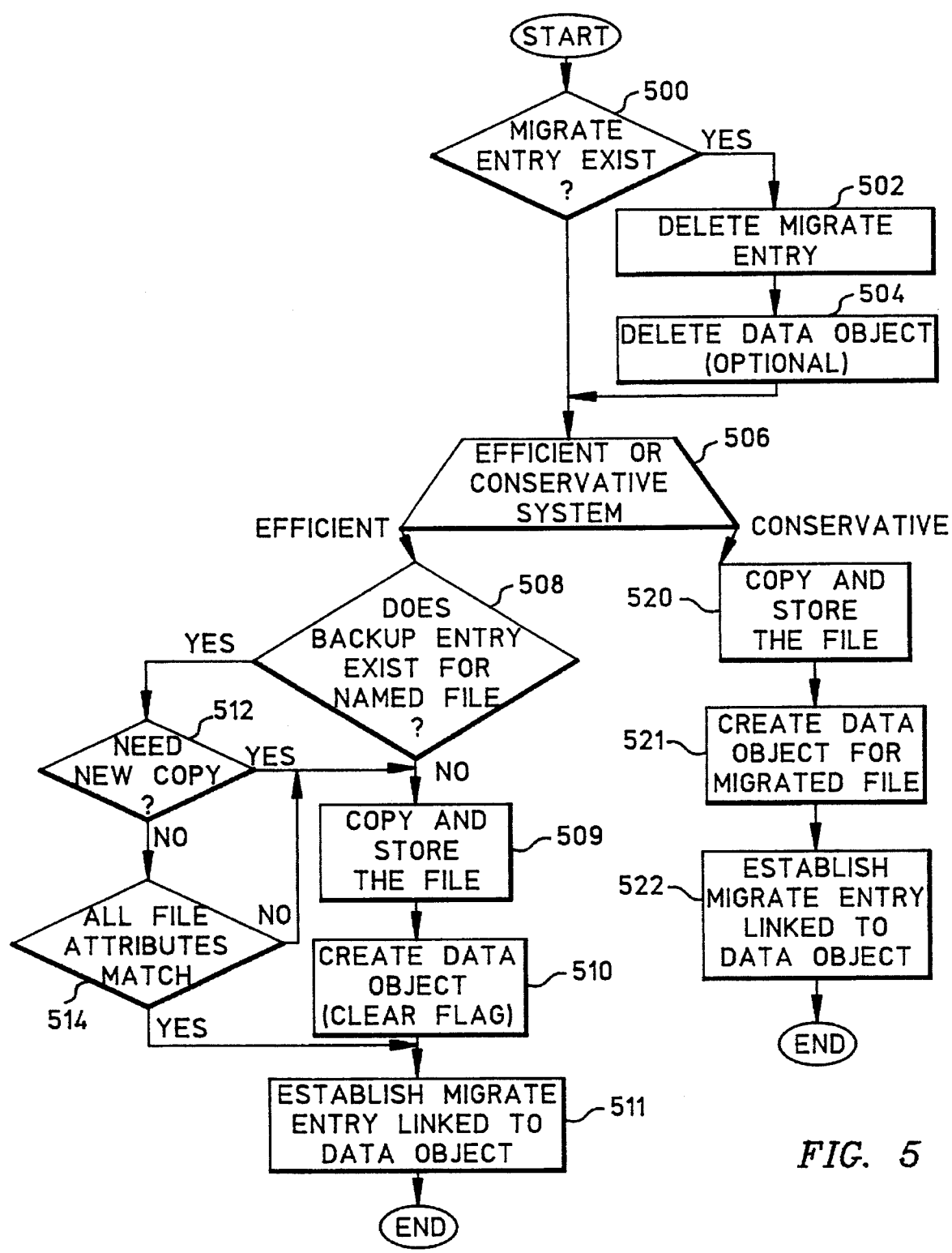
FIG. 5 is a flowchart setting forth the operational sequences used to implement a migrate operation according to a preferred embodiment of the present invention.

The operational sequence used to implement a migrate operation for a named file according to the present invention is described in the flowchart of FIG. 5. This sequence is embodied in the migration process 108B in the storage management system 100B of FIG. 1B. The operation commences block 500 by determining whether or not a migrate entry 411 (FIG. 4) exists for a named file which is specified by filepool field 413 and by OID field 419. If a migrate entry 411 exists, then program control shifts to block 502, where the migrate entry 411 is deleted. Next, at block 504, the data object 401 that the migrate entry 411 points to may be deleted as well. At Step 506, if the migration process embodies the efficient form described above, it first checks in decision box 508 to see whether a backup entry (and copy) exists for the named file. If not, a repository copy of the named file is prepared and stored in step 509, a data object library entry for the file is created in step 510, and a migrate entry for the named file which is linked to the data object created in step 510 is established and entered into the inventory at step 511. For maximum efficiency, the inventors use a flag (NEED_NEW_COPY) which is implemented in the primary file system and attached to the copy of the file forwarded for migration. The file system sets this flag each time the file is updated so that a new version of the file will be copied by the storage management system at the first opportunity. The flag is set with a date and time of the last update to the file. The storage management system clears this flag when it copies the new version of the file for migration. First, returning to step 508, if a backup entry exists for the named file, the NEED_NEW_COPY flag is inspected at step 512 to determine whether the backup copy of the file is an earlier version than the version to be migrated. If the flag is set, the positive exit is taken from step 512 and the new version is stored and inventorized according to steps 509–511. If, however, the flag is not set, the negative exit is taken from 512 and the attributes of the file forwarded for migration are compared with those of the backed up file at step 514. The attributes include, among others, file name, the date and time the file was last modified, and format attributes such as size of the file and the length and type of records it contains. If the attribute comparison indicates that the file forwarded for migration does not match the file of the same name which was previously backed up, unmatching file is stored and inventorized according to steps 509–511. If, however, the files are identical, there is no need to store a redundant copy of the file for migration. Consequently, a data object pointing to the new file does not have to be created. As a result, only a migrate entry linked to the data object pointing to the backup copy of the file has to be established and entered into the inventory, which occurs following the positive exit from 14.

In the event that the system is implemented in a conservative form described above, any named file forwarded for migration is stored and inventorized according to steps 520–522 (which correspond essentially to steps 509–511, previously described).

Figure 6A:
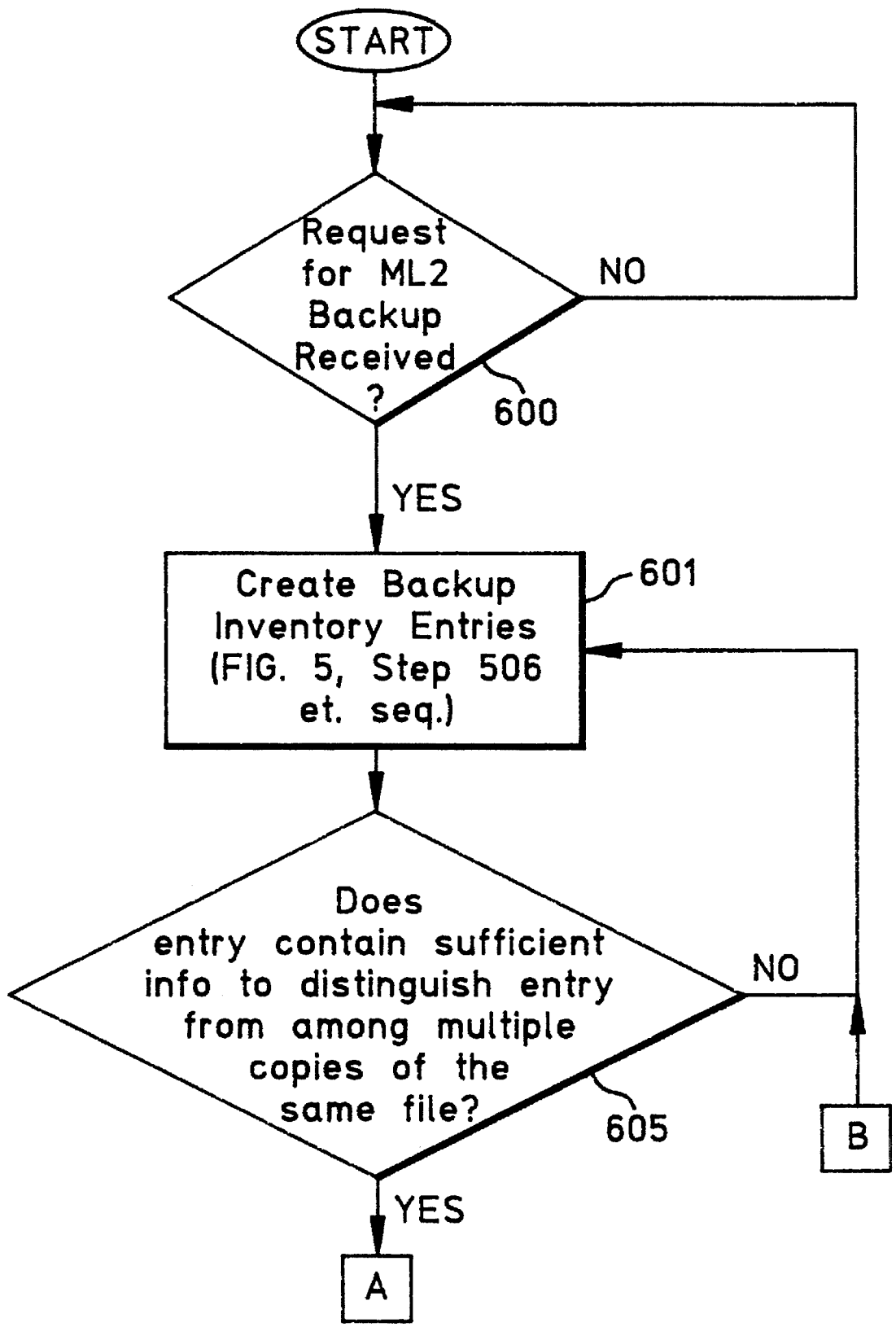
FIGS. 6A and 6B are a flowchart setting forth a process for making logical copies of files in ML2 during a filepool backup operation according to a preferred embodiment of the present invention.
Figure 6B:
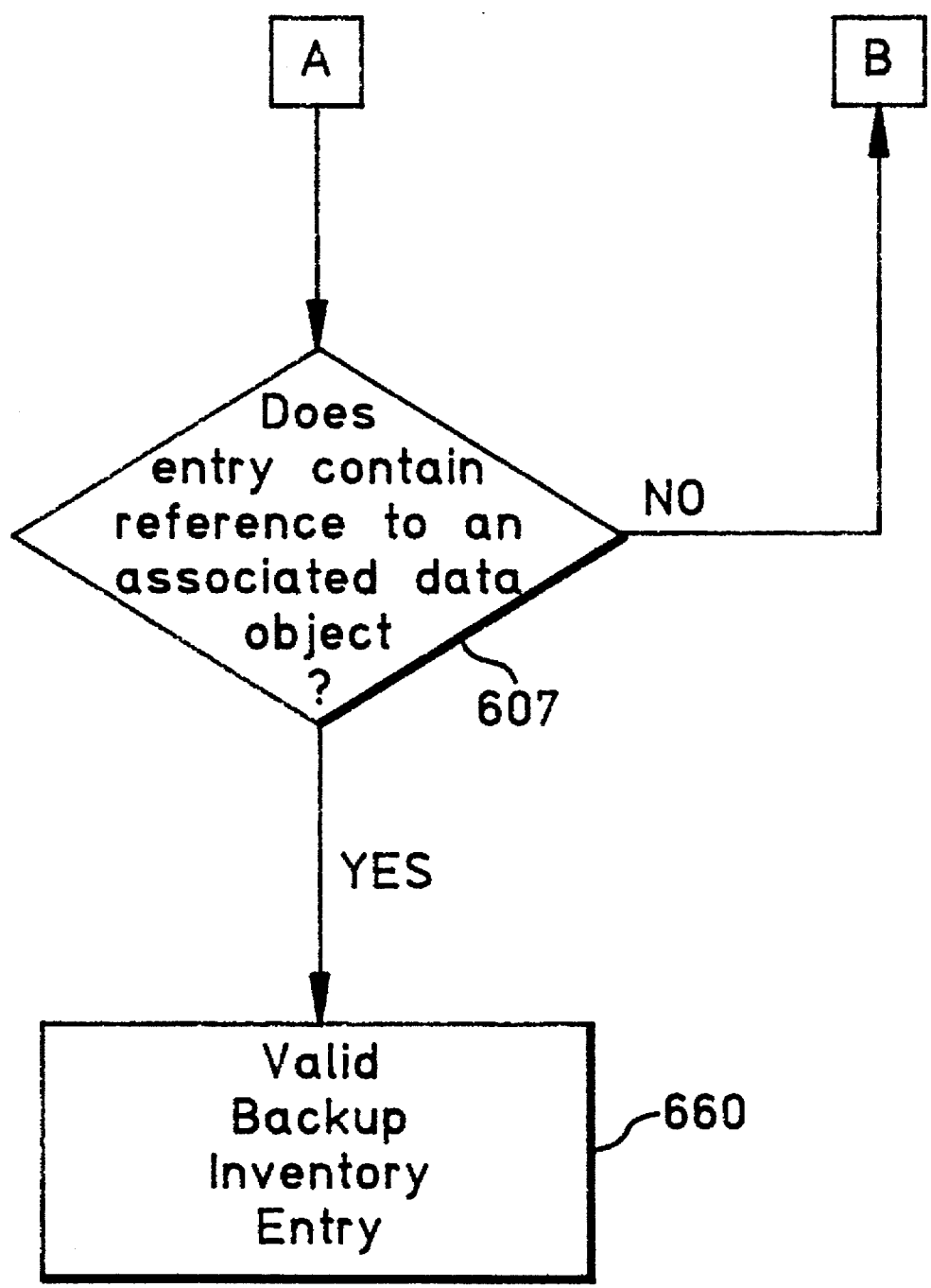

During a filepool backup operation, a function will be called from the storage management system 100B which makes a logical copy of the files in ML2. This function may be implemented using a routine entitled "backup_ML2_storage_group". The operational sequences for such a program are illustrated in the flowchart of FIGS. 6A and 6B. Note that the storage management system will return from the function at block 660 with a token which must be retained in order to restore files in ML2 corresponding to this backup.

The procedure for backup of ML2 entries will now be described with reference to FIGS. 6A and 6B. This procedure is embodied in the backup processes 106B executed in the data storage management system 100B of FIG. 1B. Block 600 conducts a test to determine whether or not a request for ML2 backup has been received. Such a request, may be received, for example, from a function termed FILEPOOL_BACKUP, which is used to implement filepool backup. When a request for an ML2 backup is received, program control progresses to block 601, where backup inventory entries are created by the storage management system 100B. The process for storing backup files creating corresponding inventory entries in step 601 conforms essentially with the process explained above with respect to migration entries beginning at step 506 of FIG. 5. However, further information relating to time of backup is required in the backup inventory entries. This further information is generated in blocks 605 and 607. Blocks 605 and 607 check to see whether or not a given backup entry meets certain predetermined criteria. All backup inventory entries must meet the following requirements. First, the entry must contain sufficient information to distinguish from among multiple copies of the same file. This condition is verified at block 605. Finally, the entry must contain a reference to the associated data object, thus permitting the data associated with the entry to be located. The entry should contain enough information so that it can be deleted when no longer required. Compliance with this requirement is verified at block 607.

Figure 7:
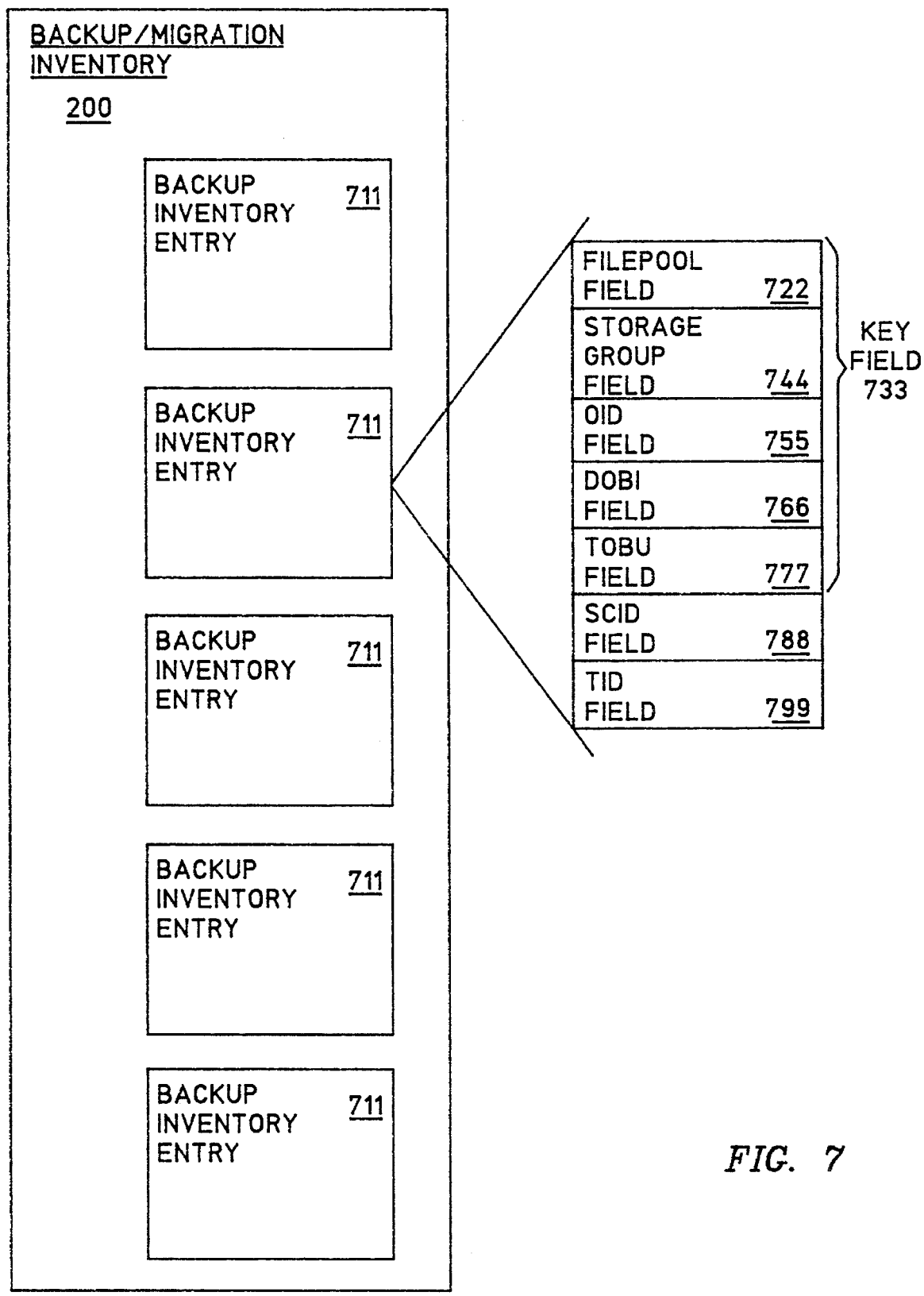
FIG. 7 is a block diagram illustrating an exemplary data structure for a backup inventory used in conjunction with a preferred embodiment of the present invention.

To meet all of the aforementioned requirements and objectives, the backup inventory entry may be structured as shown in FIG. 7, employing the backup/migration inventory 200. The inventory 200 includes at least one inventory entry, such as backup inventory entry 711. The inventory 200 may also include one or more migrate inventory entries.

Each backup inventory entry 711 includes a FILEPOOL field 722 which specifies the filepool on the filepool backup. This structure is used to locate the backup inventory entry 711, and to re-establish a migrate inventory entry during execution of filepool restore and/or filepool file load functions.

The backup inventory entry 711 also contains a STORAGE_GROUP field 744, which is the storage group specified on the filepool backup. This is used to locate the backup inventory entry 711, and to re-establish a migrate inventory entry during execution of filepool restore and/or filepool load functions. The STORAGE_GROUP field 744 in the illustrated embodiment is also a part of the OID field 755, to be described below.

The backup inventory entry 711 contains a third structure called the OID field 755. This field consists of the OID from the migrate inventory entry of the file that was backed up. It is used during execution of a filepool restore function to re-establish the migrate inventory entry. It may also be used in conjunction with the filepool fileload function to locate the proper backup inventory entry 711.

The DOBI field 766 is the fourth field contained within the backup inventory entry 711. The DOBI field 766 includes the data object identifiers from the migrate inventory entry. The DOBI field 766 points to the related data objects. This field is required in order to associate a created migrate inventory entry with the proper data during execution of the filepool restore and/or filepool fileload functions.

The backup inventory entry 711 contains a fifth item termed the "time stamp of backup" (TOBU) field 777. The TOBU field 777 is used to delete backup inventory entries 711. It is also used to distinguish among multiple backup copies having the same OID field 755. The TOBU field 777 can be used merely as a token (a key field) when implementing backup and/or restore functions.

The five fields 722, 744, 755, 766 and 777 together form a key field 733.

The sixth item contained by the backup inventory entry 711 is a "sequential change identifier" (SCID) field 788. This field is employed for the purpose of re-establishing a migrate inventory entry during execution of a filepool restore function. The seventh and final item contained by the backup inventory entry is a "tuple identifier" (TID) field 799, which is used to re-establish a migrate inventory entry during execution of a filepool restore function.

Execution of a FILEPOOL FILELOAD function requires that the OID 755, SCID 788, and TID 799 fields corresponding to the specified file as the file was backed up, be provided to the storage management system 100B in order to locate the backup entry. The storage management system also requires the 6ID 755, SCID 788, and TID 799 fields corresponding to the specified file to be restored in order to create the migrate inventory entries 411 (FIG. 4).

Figure 8:
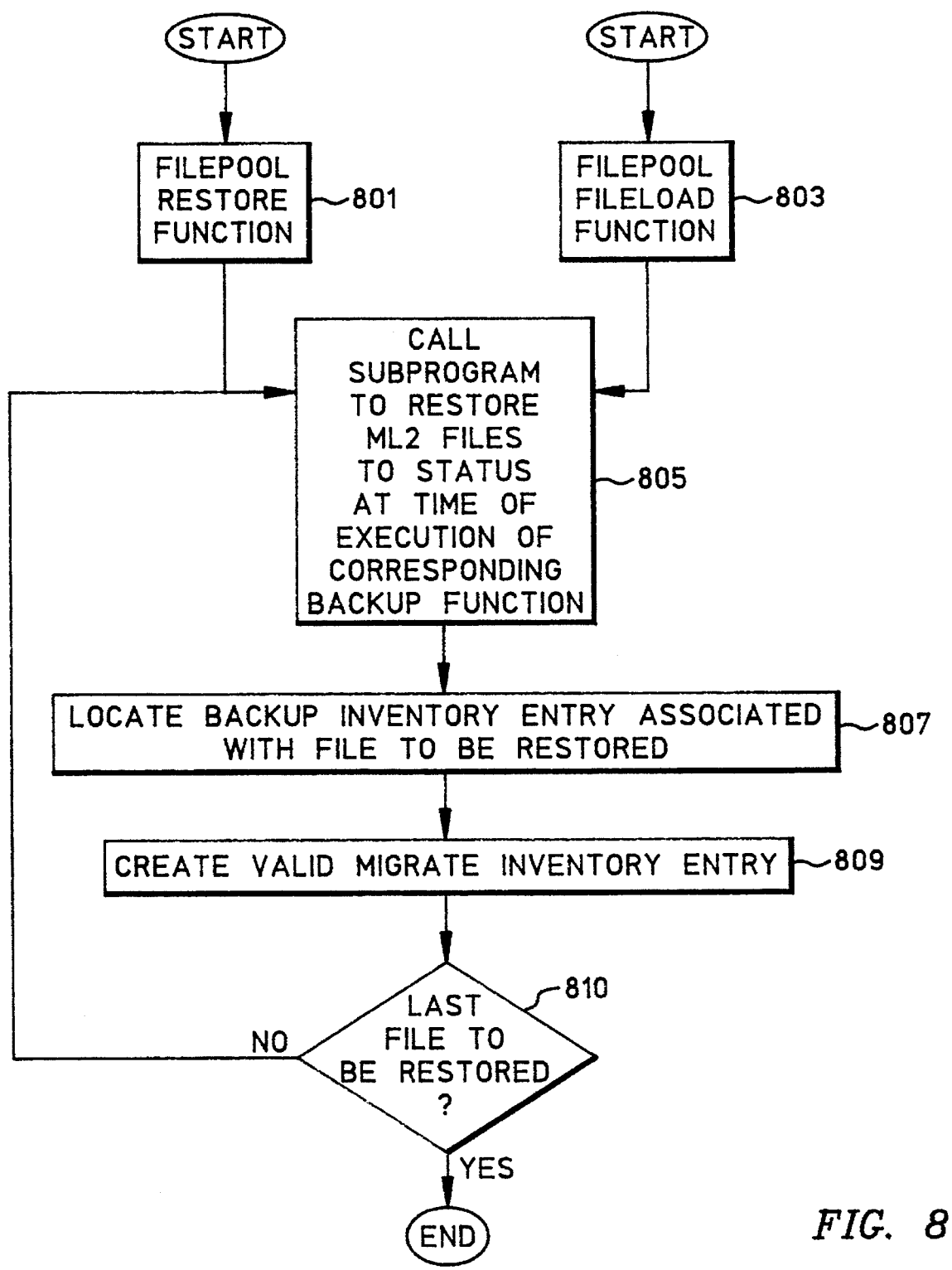
FIG. 8 is a flowchart setting forth the operational sequences used to implement filepool restore and filepool fileload functions according to a preferred embodiment of the present invention.

The immediately preceeding paragraphs set forth a description of the data structures and procedures followed to provide an ML2 backup. Next, the restoration and file loading functions of ML2 will be described with reference to the flowchart of FIG. 8. The operational sequences set forth in FIG. 8 may be commenced at block 801, during execution of a FILEPOOL RESTORE function, and/or at block 803, during excution of a FILEPOOL FILELOAD function. During execution of these functions, at block 805, a subprogram is called. This subprogram includes subroutines for restoring the files in ML2 to the status that the files had at the execution time of the corresponding file backup function. These subroutines include a first subroutine entitled "restore_ML2_storage_group", and a second subroutine entitled "restore_ML2_file". These subroutines, as well as the subprogram itself, will be described hereinafter. The subprogram is provided by the storage management system 100B.

After the subprogram has performed the functions set forth in block 805, the backup inventory entry associated with the file to be restored is located at block 807. The backup inventory entry may be located by utilizing various input which were previously provided to the storage management system. The system then creates the necessary valid migrate inventory entry at block 809, based upon the aforementioned input and the backup entry. A test is performed at block 810 to ascertain whether or not additional files are to be restored. If additional files must be restored, the program loops back to block 805. If no additional files need to be restored, the subprogram ends. No data are moved, and no tapes are mounted, during the process shown in FIG. 8.

The process of deleting inventory entries will now be described according to a preferred embodiment of the invention. A migrate inventory entry is erased if any of the following circumstances exist: (1) the file is recalled; (2) the file is erased in the primary filespace; (3) the file is expired by DFSMS. (Item (3) is merely a special case of item (2)).

The storage management system 100B must be provided with information specifying the expiration time for the backup inventory entries. If an expiration time is not specified, the data will be retained forever, thus preventing the backup/migration inventory 200 server from ever being able to reclaim its tapes. A system command must be provided to allow the system administrator to expire backup entries associated with a specific filepool and storage group that are older than a specified date and time. The goal of such a command is to expire the backup entries and the sets of tapes that are associated with the entries at the same point in time.

Although a data storage management system need not include explicit provisions for expiring its backup tapes, the tapes are, in fact, manually expired when they are returned to the tape scratch pool. However, the system should preferably contain a provision for notifying the system administrator that the tapes should be expired. This notification should occur at the same time that the corresponding storage management system command to delete the ML2 backups is issued. When the last inventory entry associated with a data object is erased, the storage management system 100B will also erase the data object itself. This erasure process frees up the tape during the next tape reclamation process.

FIGS. 9A–9I set forth specific examples of the manner in which the operational sequences of FIGS. 5, 6A, 6B, and 8 may be applied to the data structures of FIGS. 3, 4, and 7. These figures presume the most efficient embodiment of the invention in which a single repository copy of a file is used for migration and backup. FIG. 9A illustrates the operation of file migration, showing the inventory entries representing a migrated file. The contents of an exemplary migrate inventory entry 411 and an exemplary data object 401 are shown. The FILEPOOL field 413 of the migrate inventory entry contains an indicator specifying file pool 1, designated as "f1". The OID field 419 contains a value indicating object one (o1), the DOBI field 407 identifies data object one (d1), the sequential change identifier (SCID) field 423 specifies sequential change value sd1, and tuple identifier (TID) field 435 identifies tuple 1 (td1). Note that the data object identifier (DOBI) field 407 of data object 401 specifies data object one (d1), and the data column 404 representing the contents of the repository file 406 (FIG. 4) specifies repository data file 1 (data1).

FIG. 9B is an example showing the data structures which result when the file f1 is backed up. The data structures of FIG. 9B indicate that the file was migrated, and that one file backup operation was performed. Note that FIG. 9B shows the contents of an exemplary backup inventory entry 711.

FIG. 9C illustrates the data structures for a condition where a backup operation has been performed twice. The resulting structure is similar to that of FIG. 9B; however, two backup entries are present in FIG. 9C, whereas FIG. 9B included only one such entry. Each of the backups in FIG. 9C is represented by its own backup inventory entry 711. The second backup entry has a TOBU field 777 value of t2, corresponding to a creation time of time 2. In this example, it is assumed that t2 is later than t1.

FIG. 9D shows data structure contents where backup copies as old or older than a predetermined time are deleted. This operation is performed on the data structures of FIG. 9C. The predetermined time is defined as the value of the earliest TOBU field 777, designated as t1. A file represented by a TOBU field more recent than time t1 (i.e., time t2) will be retained as a migrated file with its associated backup.

FIG. 9E illustrates the case where a file is renamed and then backed up again, without a recall. The result is a migrated file with two backups under different names.

FIG. 9F presents a scenario where the file of FIG. 9E is erased. The data structures remaining after the erasure operation specify two file backups, with each backup being listed under a different name. One backup has a TOBU field 777 corresponding to time two (t2), and a second backup has a TOBU field corresponding to time three (t3), where t3 is more recent that t2.

FIG. 9G shows the data structures resulting from a file being restored with the value of the TOBU field 777 equal to time two (t2). The file was restored to the same filepool using the FILEPOOL FILELOAD function. The resulting data structures represent a migrated file with two backups under different names. One of the backups has a TOBU field 777 corresponding to time two (t2), and the other backup has a TOBU field corresponding to time three (t3), where t2 is earlier that t3.

The example of FIG. 9H illustrates a case where the backup copies of FIG. 9G have all been deleted, pursuant to the execution of a function removing all backups as old or older than time three (t3). Note that this operation serves to free up the data structures. Two data structures (representing the backups of FIG. 9G) no longer appear in FIG. 9H. FIG. 9I shows the migrated file erased. Note that all data structures have been freed, and the data are gone.

Figure 10A:
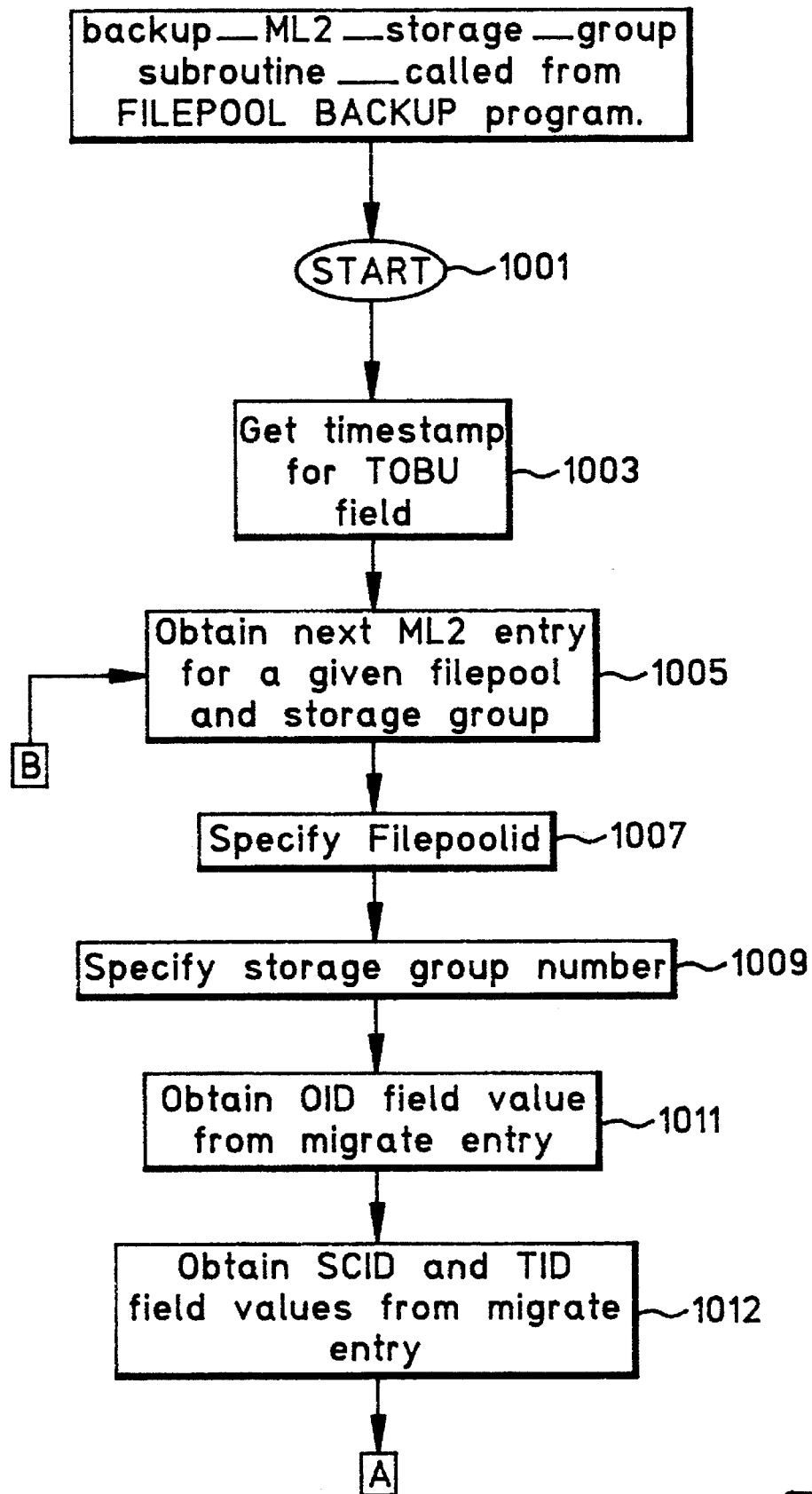
FIGS. 10A and 10B are a flowchart setting forth program flow for a subroutine entitled "backup_ML2_storage_ group".
Figure 10B:
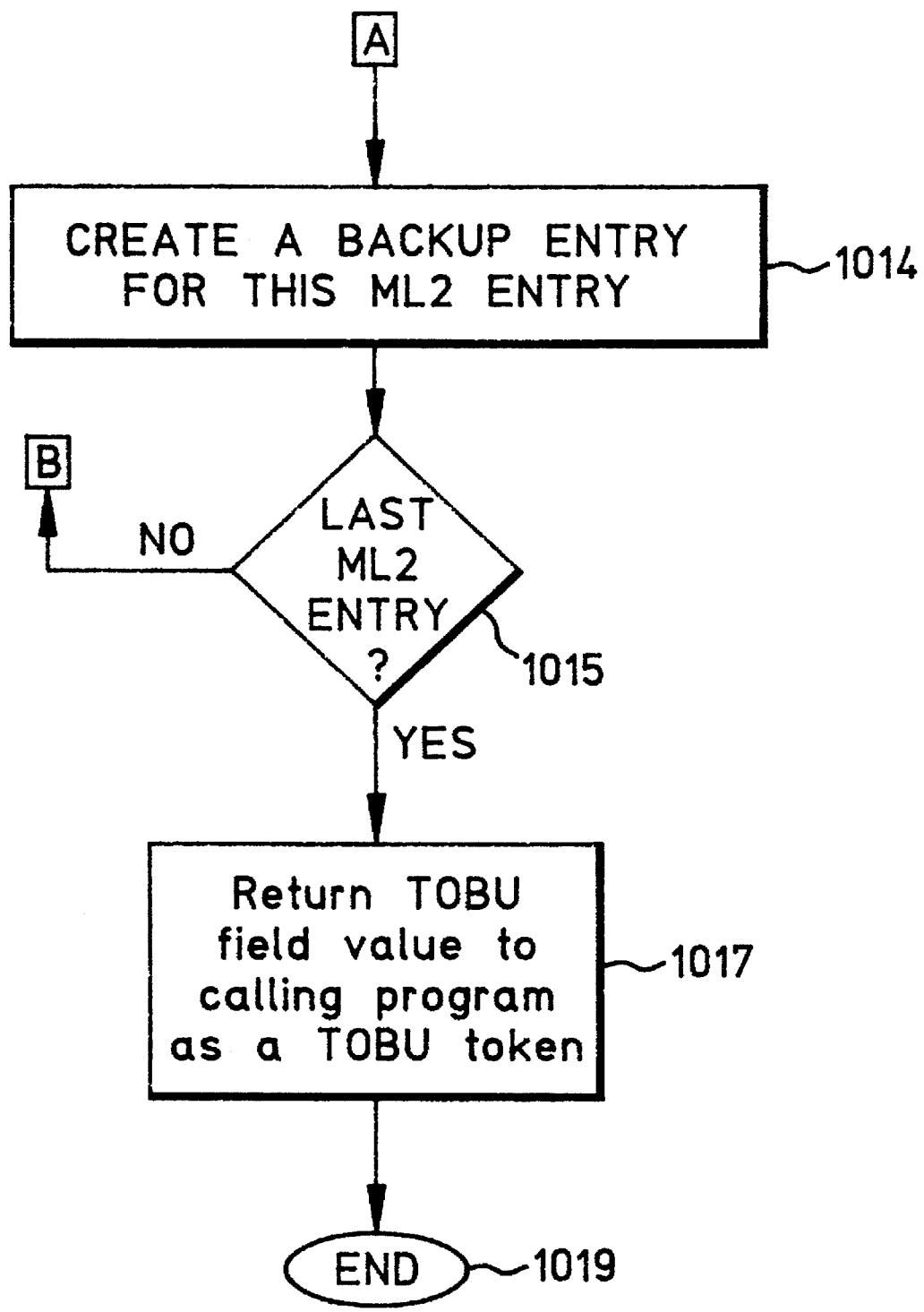
Figure 11A:
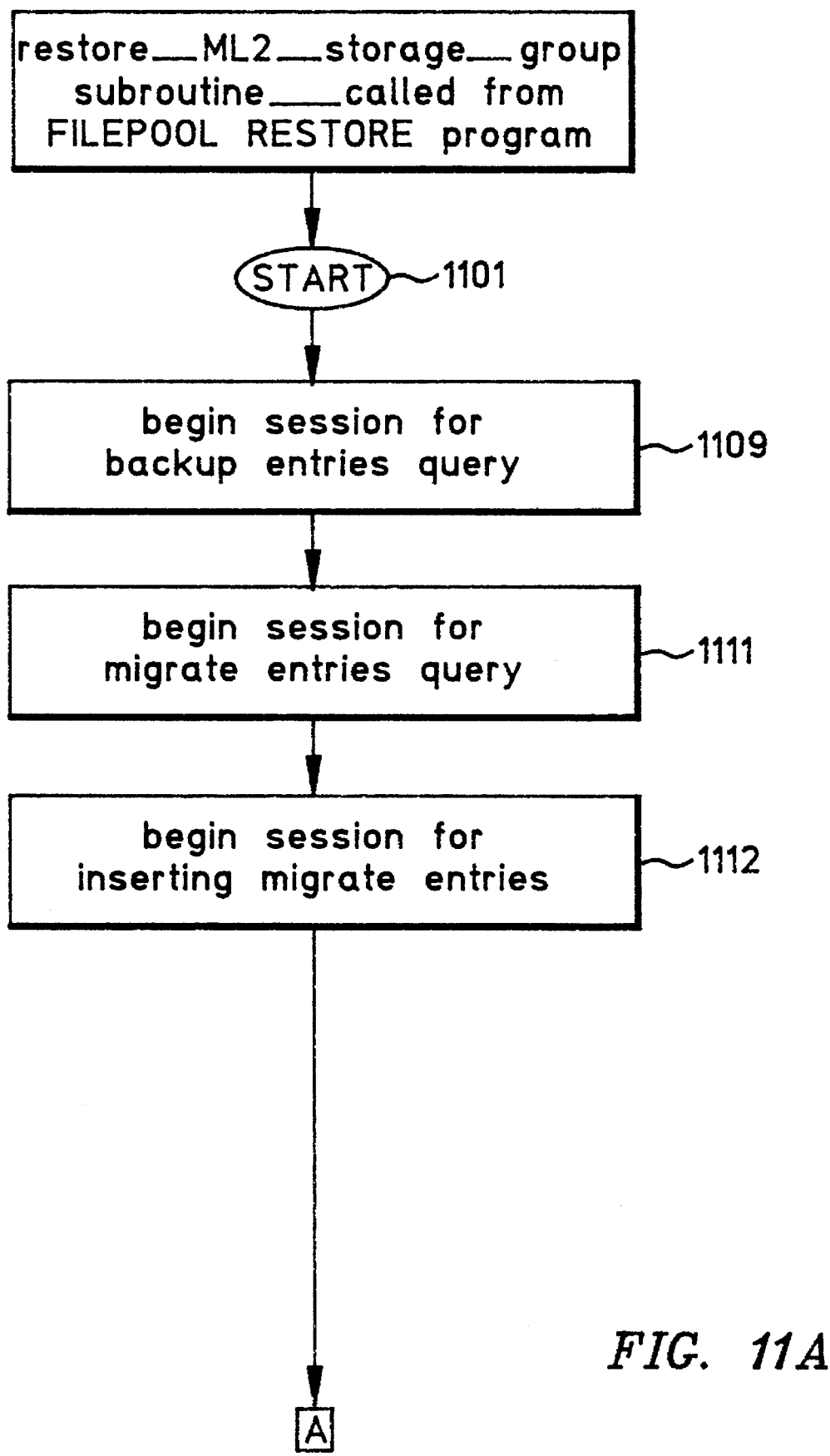
Figure 11B:
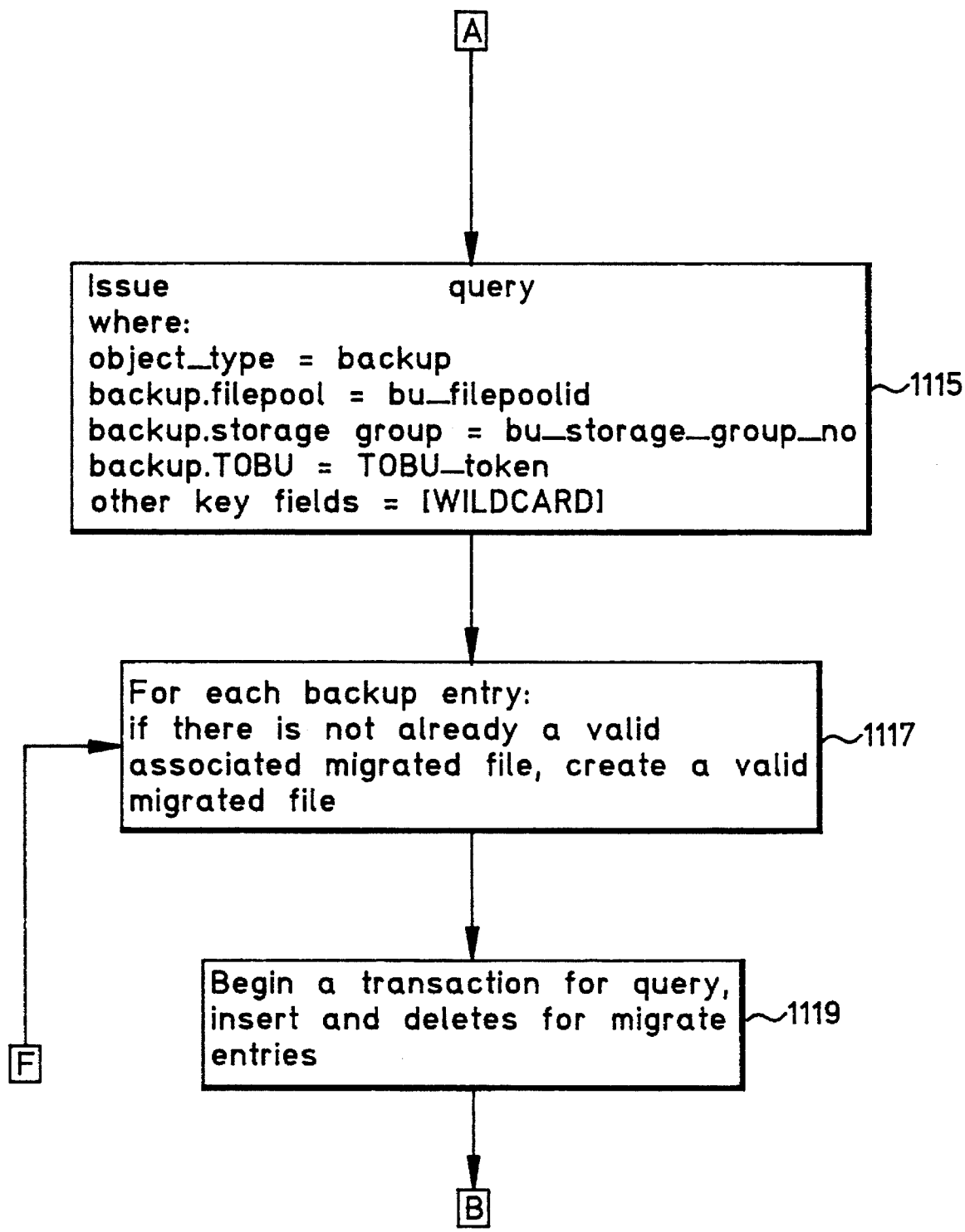
Figure 11C:
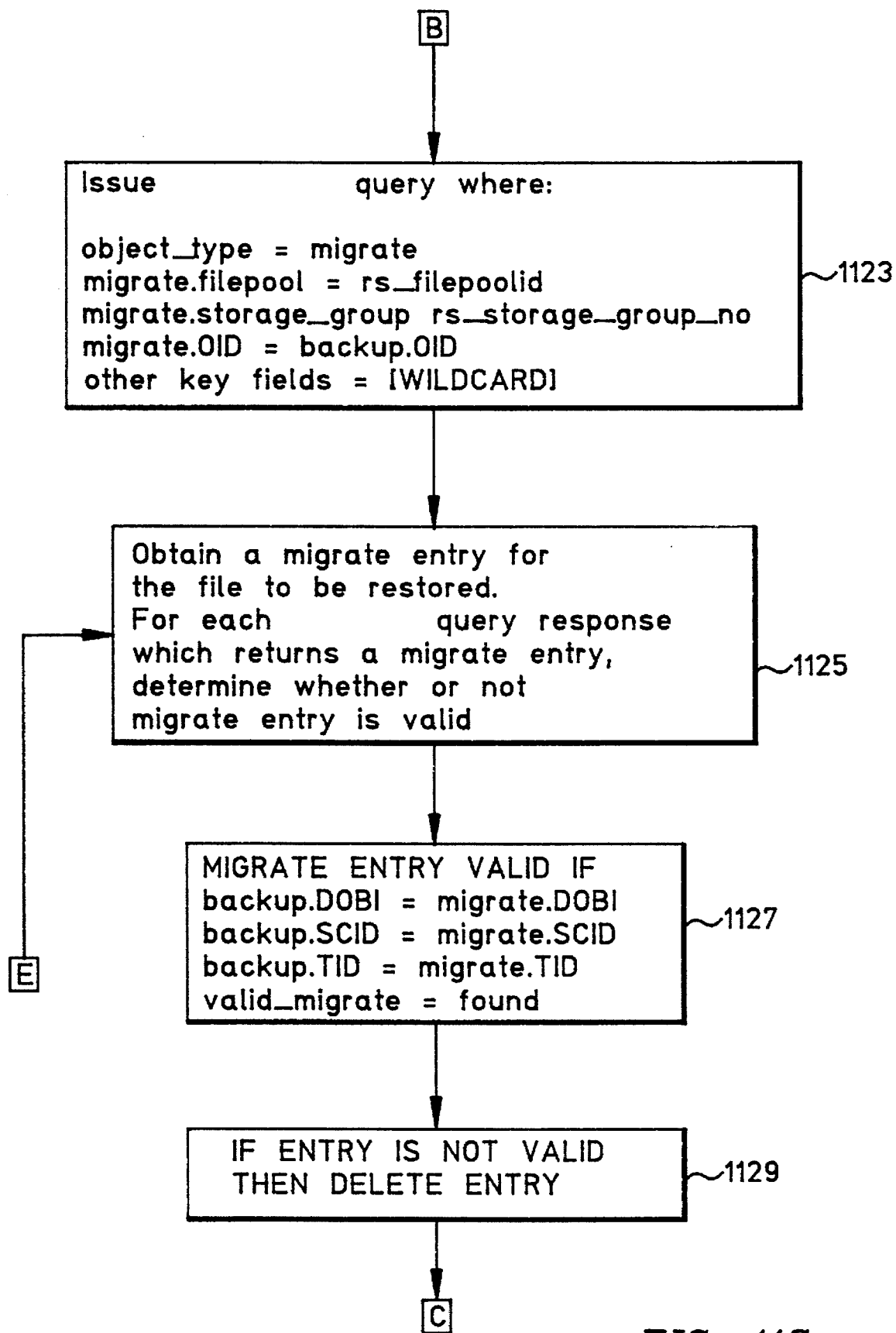
Figure 11D:
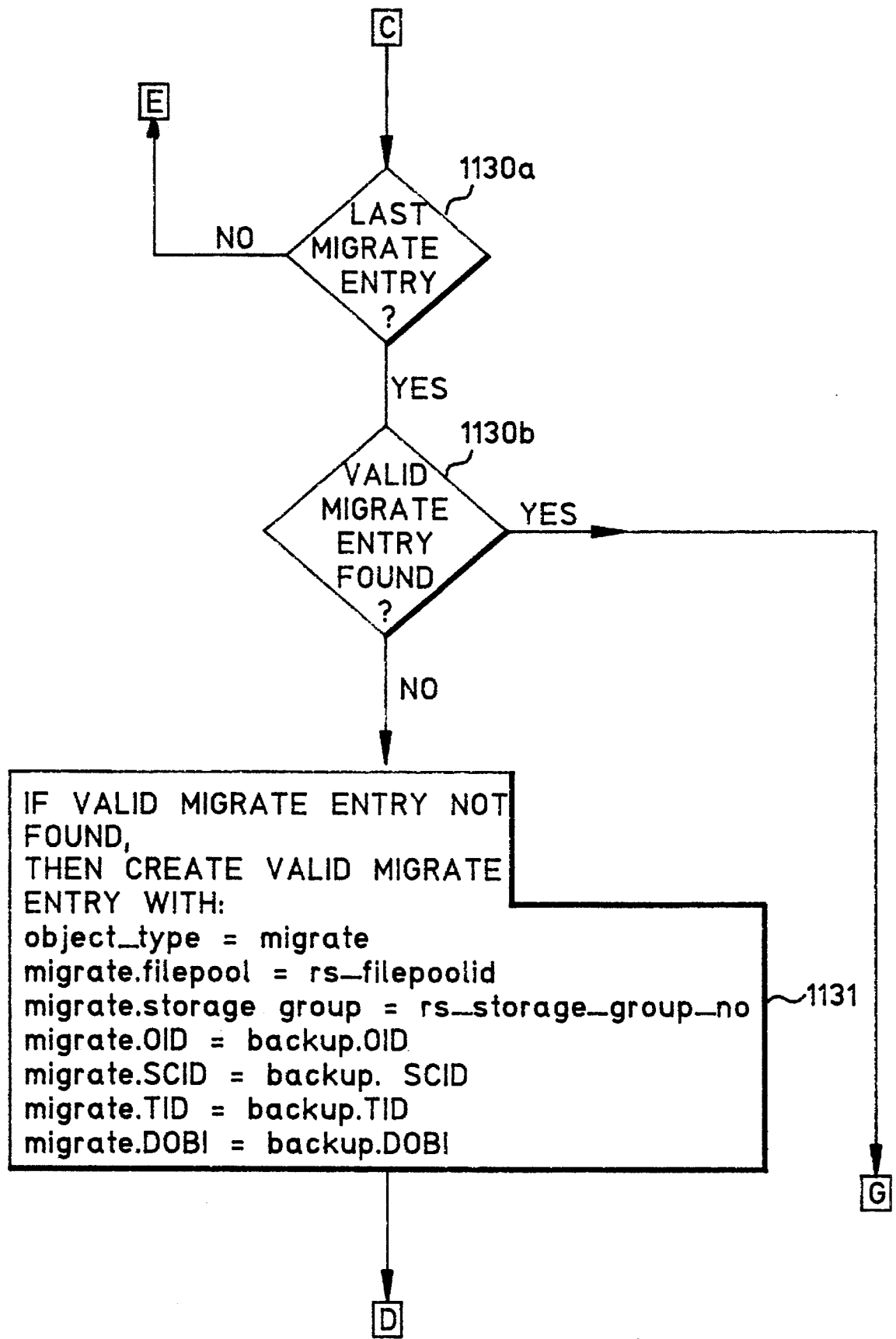
Figure 11E:
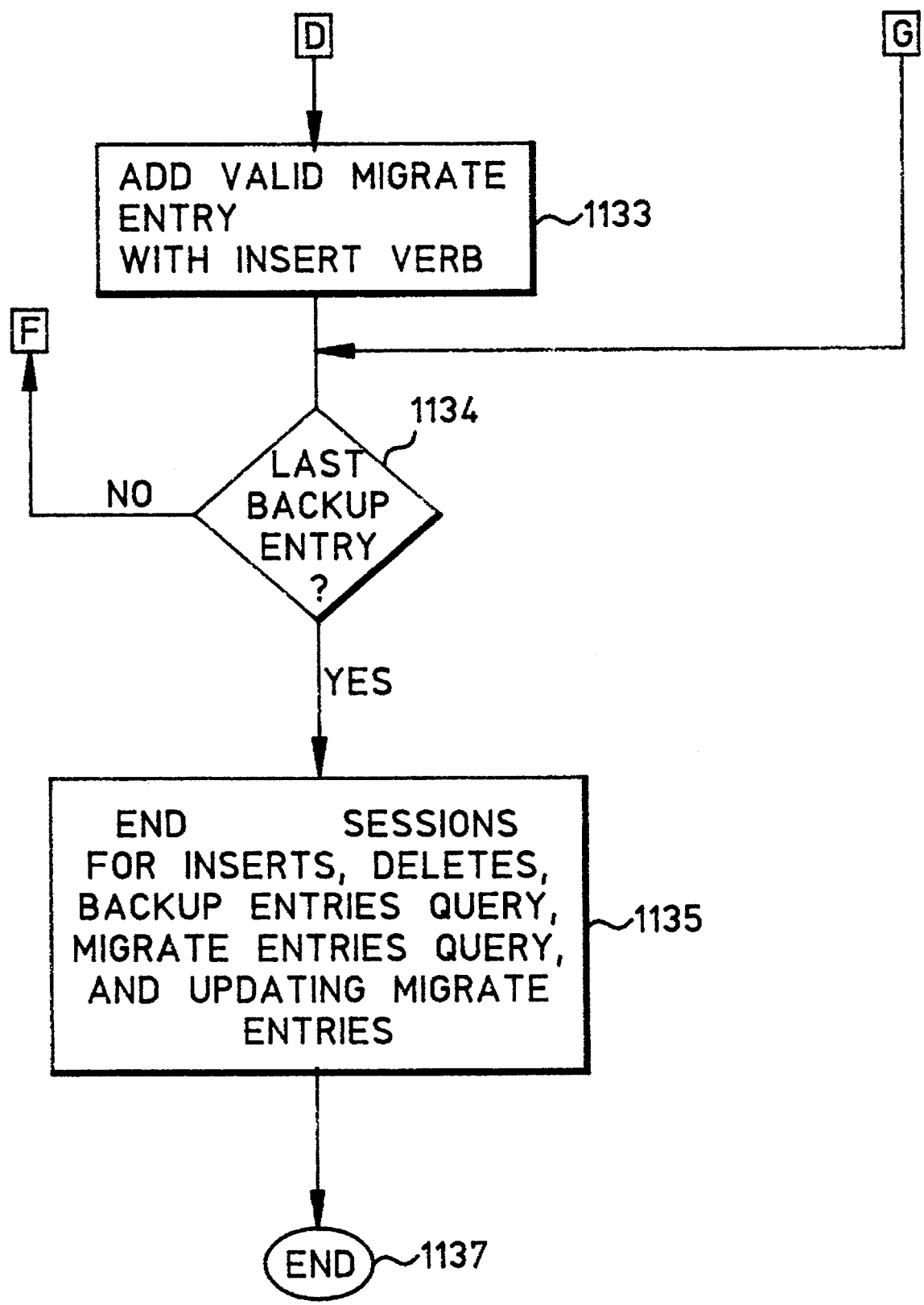
Figure 12B:
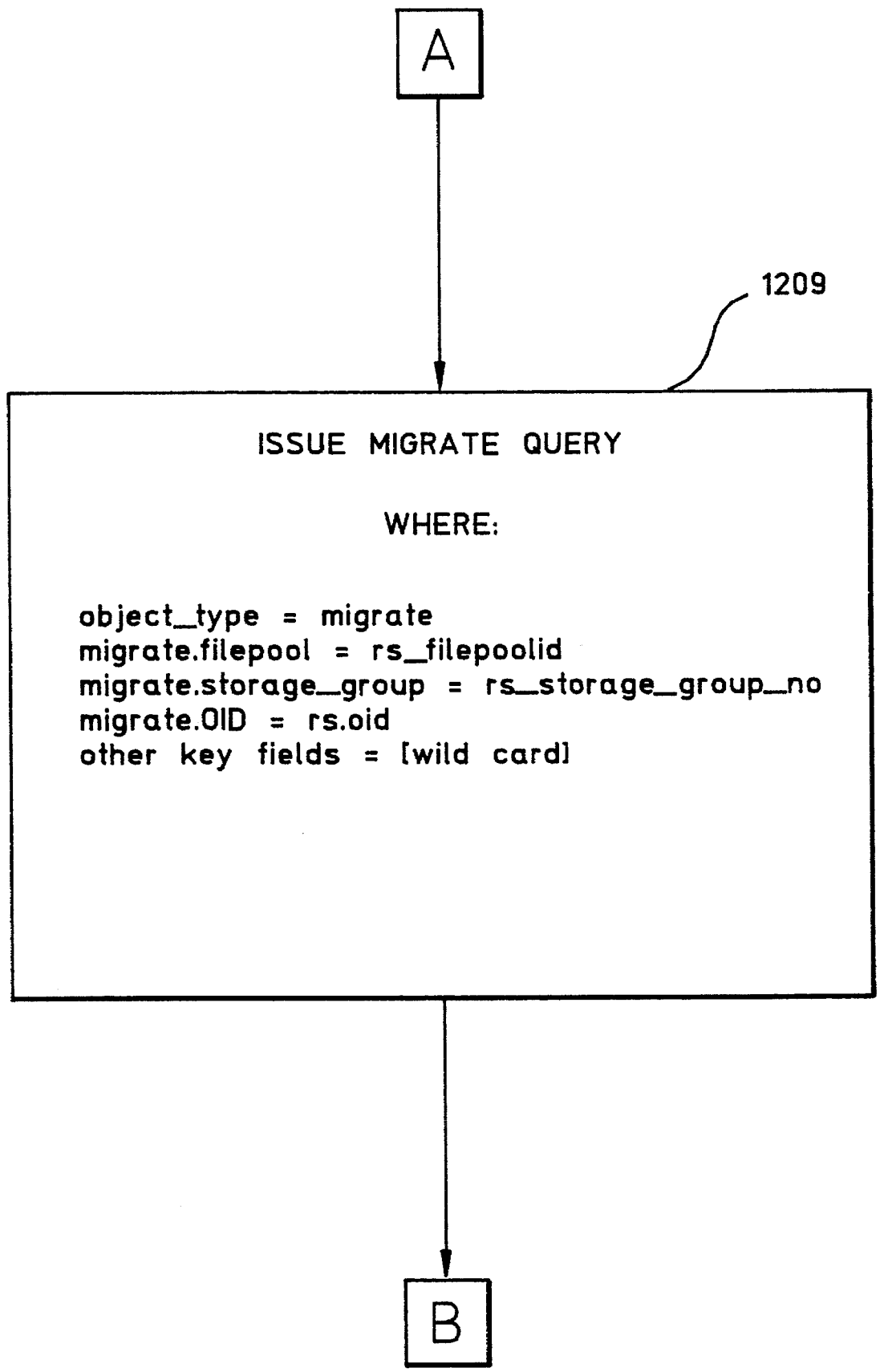
Figure 12C:
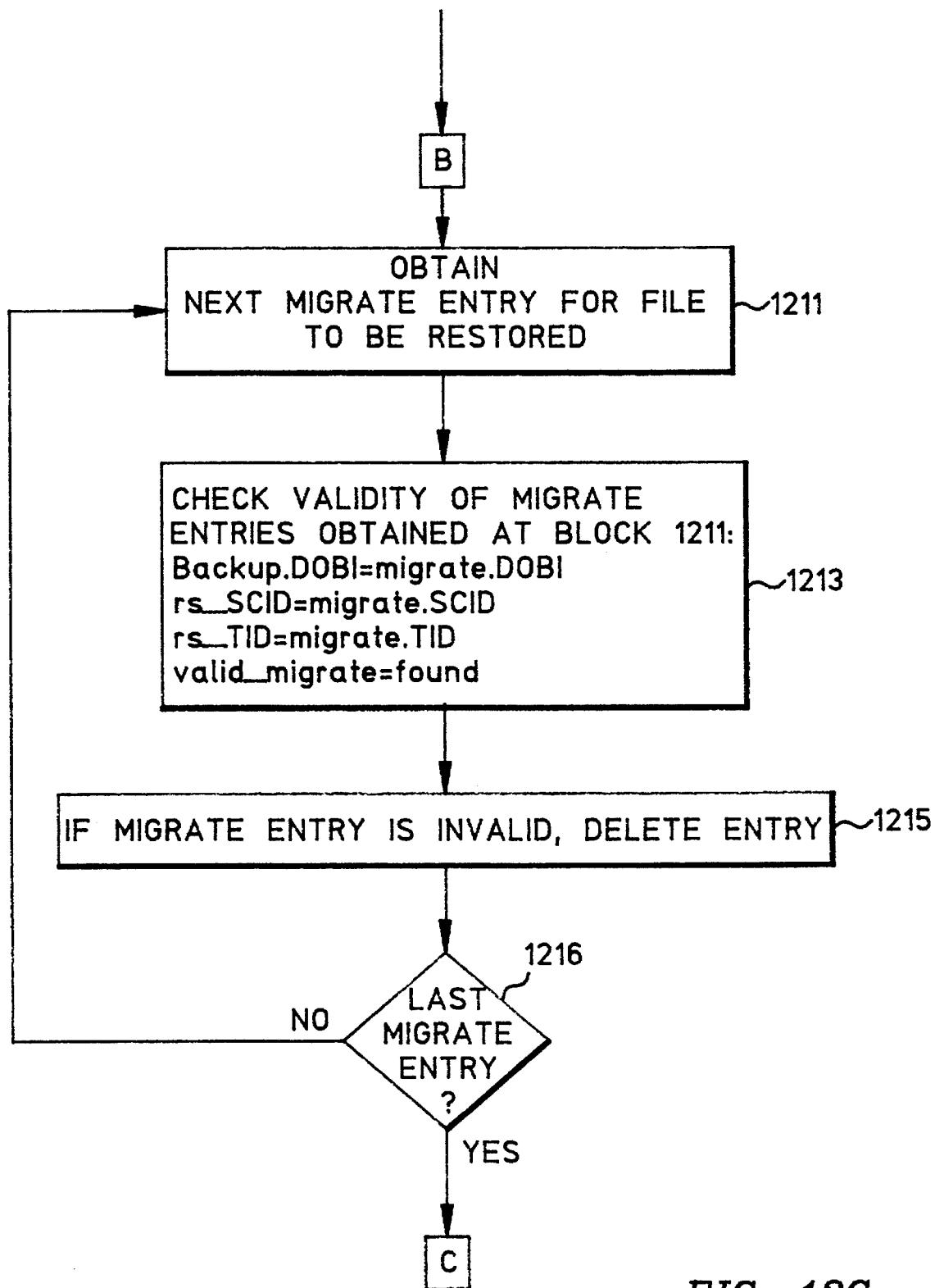
Figure 12D:
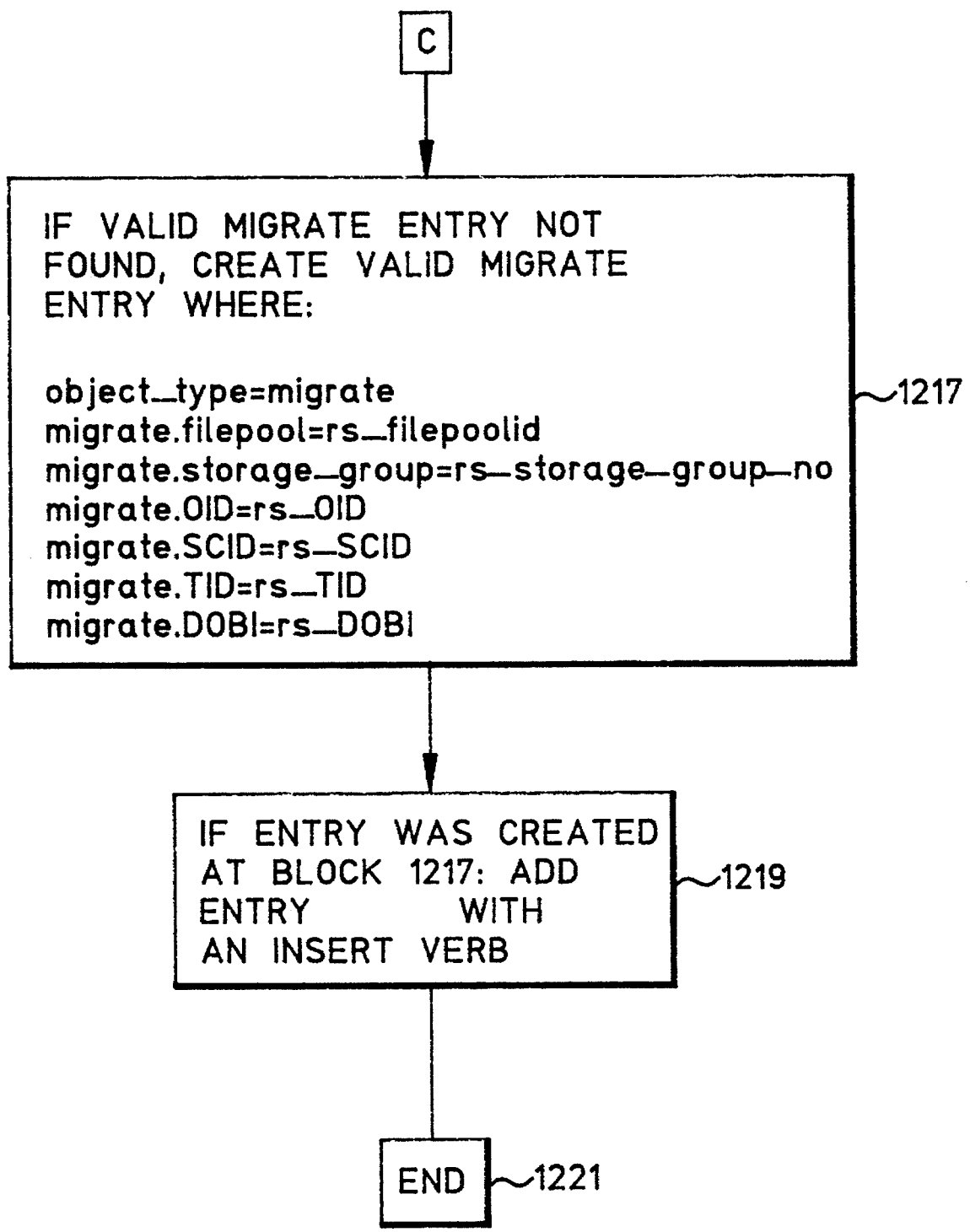

FIGS. 10A and 10B are a flowchart setting forth program flow for the subroutine entitled "backup_ML2_storage_group". The function of this subroutine is to create a logical backup of migrated file data for a file system storage group. The subroutine is executed by the storage management system 100B of FIG. 1B. The backup_ML2_storage_group subroutine is executed when the subprogram is called from the FILEPOOL BACKUP operation. The subroutine accepts two inputs: a filepoolid, and a storage_group_no. The filepoolid identifies the filepool containing the storage group to be backed up. The storage_group_no is a number between 2 and 32767 which identifies the storage group within the specified filepool. The subroutine first generates a TOBU token. This token is saved for later use by the storage management system during file or storage group restoration operations.

With reference to FIGS. 10A AND 10B, the backup_ML2_storage_group subroutine starts at block 1001 when called by the program which implements filepool backup. At block 1003, a time stamp value is obtained for the TOBU field 777 (FIG. 7). Next, at block 1005, the next ML2 entry is obtained for the given filepool and storage group. The backup entry is created by implementing the steps set forth in blocks 1007–1014.

At block 1007, the value for the filepoolid variable is specified. The storage group number is specified in block 1009, and the OID field value is obtained from the migrate entry in block 1011. Block 1012 obtains the SCID and TID field values from the migrate entry. At block 1014, a backup entry is created for this ML2 entry. Block 1015 performs a test to see whether this is the last ML2 entry. If this is the last ML2 entry, program control goes to block 1017. If there are more ML2 entries, program control goes back to block 1005.

At block 1017, the TOBU field value is returned to the calling program as a TOBU token. The subroutine backup_ML2_storage_group transfers program control back to the calling program at block 1019.

FIGS. 11A–E are a flowchart setting forth program flow for the subroutine entitled "restore_ML2_storage_group" which is executed when the subprogram is called from the FILEPOOL RESTORE operation. This subroutine is executed by the storage management system 100B and restores all of the ML2 files in a storage group that were backed up via the operations of FIGS. 10A and 10B.

With reference to FIGS. 11A–E, the restore_ML2_storage_group subroutine begins at block 1101. The subroutine accepts input values for five parameters. The first parameter is bu_filepoolid, which identifies the filepool from which the files were originally backed up. The second parameter is bu_storage_group_no, which is an number between 2 and 32767 that identifies the storage group within the specified bu_filepool from which the files were originally backed up. TOBU_token is the third parameter, which is provided by the storage management system on return from the routine described in FIGS. 10A and 10B. These three parameters could be viewed and used as tokens if desired.

The fourth input parameter is rs_filepoolid, which identifies the filepool to which the files are to be restored. The fifth and final input parameter is rs_storage_group_no, which is a number between 2 and 32767 that identifies the storage group within the specified rs_filepool to which the files are to be restored.

After accepting the five input parameters, program control progresses to block 1109.

The session for backup entries query is started at block 1109, the session for migrate entries query is started at block 1111, and the session for inserting ML2 entries is started at block 1112. A query is issued at block 1115, where the object_type=backup, the backup.filepool=bu_filepoolid, the backup.storage_group=bu_storage_group_no, the backup.TOBU=TOBU_token, and the other key fields are wildcard values.

After the query is issued, backup entries are obtained at block 1117. One backup entry is obtained for each query response. Next, a transaction is commenced for query, insert, and deletes for migrate entries (block 1119). A query is initiated at block 1123. The query is performed such that object_type=migrate, migrate.filepool=rs_filepoolid, migrate.storage_group=rs_storage_group_no, migrate.OID=backup.OID, and the other key fields are wildcard values.

After the query is performed at block 1123, block 1125 obtains a migrate entry for the file to be restored. For each query response which returned a migrate entry in block 1123, the program ascertains whether or not the migrate entry is valid (block 1125). As shown at block 1127, the migrate entry is still valid if backup.DOBI=migrate_DOBI, backup.SCID=migrate.SCID, and backup.TID=migrate.TID. Only one valid migrate entry can exist. If a valid entry is found, this is indicated by valid_migrate=found. If the entry is not valid, it is deleted at block 1129. Such an out of sync entry is deleted by issuing a delete verb. If this is the last migrate entry, program control passes from block 1130a to block 1130b. If there are more migrate entries, program control goes from block 1130a to block 1125.

If a valid migrate entry was not found, the program implements an operation at block 1131 to create a valid migrate entry. The entry is created with object_type=migrate, migrate.filepool=rs_filepoolid, migrate.storage_group=rs_storage_group_no, migrate.OID=backup.OID, migrate.SCID=backup.SCID, migrate.TID=backup.TID, and migrate.DOBI=backup DOBI. At block 1133, the valid migrate entry is added with an insert verb. At block 1134, a test is performed to see whether or not this is the last backup entry. If so, program control progresses to block 1135. If there are more backup entries, program control loops back to block 1117. The sessions for inserts, deletes, backup entries query, migrate entries query, and updating migrate entries are terminated at block 1135. The restore_ML2_storage_group subroutine ends at block 1137.

FIGS. 12A–12D are a flowchart setting forth program flow for the subroutine entitled "restore ML2 file". The restore_ML2_file subroutine is executed when the subprogram is called from a FILEPOOL FILELOAD operation. This subroutine restores an ML2 file in a storage group that was backed up using the operational sequences depicted in FIGS. 10A–10B; it is executed by the storage management system 100B of FIG. 1B.

The subroutine restore_ML2_file accepts nine input parameters: (1) bu_filepoolid, which identifies the filepool from which the files were originally backed up; (2) bu_storage_group_no, a number between 2 and 32767 which identifies the storage group within the specified bu_filepool from which the files were originally backed up; (3) TOBU token, a token provided by DFSMS/VM on return from the subroutine of FIGS. 10A and 10B; (4) bu_oid, which represents the value of the OID field at the time that the filepool was backed up; (5) rs_filepoolid, which identifies the filepool to which the files are to be restored; (6) rs_storage_group_no, a number between 2 and 32767 that identifies the storage group within the specified rs_filepool to which the files are to be restored; (7) rs_oid, which represents the new OID for the file to be restored; (8) rs_scid, which represents the scid for the file to be restored; and (9) rs_tid, which represents the TID for the file to be restored. Note that the first three parameters could be viewed and employed as tokens for purposes of the restore_ML2 file subroutine, if desired.

The overall program flow for the restore_ML2_file subroutine is as follows. First, a search is performed to locate a backup entry corresponding to a specified file. If there is not already a valid migrated file, the subroutine creates such a file. The subroutine clears up out of sync conditions, and the routine then terminates.

A more detailed logical structure for the restore_ML2_file subroutine is presented in FIGS. 12A–12D. The program commences at block 1203 where a process is initiated to find the backup entry for a specified file. A query is issued where object_type=backup, backup.filepool =bu_filepool, backup.storage_group=bu_storage_group_no, backup.OID= bu oid, backup.TOBU=TOBU token, and other key fields are wildcard values. A query request is issued at block 1209, where object_type=migrate, migrate.filepool=rs_filepoolid, migrate.storage_group=rs_storage_group_no, migrate_OID=rs_oid, and other key fields are wild card values.

After the query request is issued, from each of the query responses, block 1211 obtains a migrate entry for the file to be restored. The validity of the migrate entries so obtained is checked at block 1213. The entry is valid if backup.DOBI=migrate.DOBI, rs_SCID=migrate.SCID, and rs_TID=MIGRATE.TID. Only one valid migrate entry can exist. This is indicated by valid_migrate=found. Migrate entries that are not valid are deleted at block 1215 by means of a delete procedure. At block 1216, if this is the last migrate entry, program control progresses to block 1217. If there are more migrate entries, control goes to block 1211.

If a valid migrate entry is not found, the program creates a valid entry at block 1217 with the following parameters: object_type=migrate, migrate.filepool=rs_filepoolid, migrate.storage_group=rs_storage_group_no, migrate.OID=rs_OID, migrate.SCID=rs_SCID, migrate.TID= rs_TID, and migrate.DOBI=backup.DOBI. Next, if a valid migrate entry was created in block 1217, the entry is added with an insert verb (block 1219). The subroutine terminates execution at block 1221.

INDUSTRIAL EMBODIMENT

An industrial embodiment of the invention is illustrated in FIG. 13 where a computer 1310, preferably of the IBM System 370/ESA type, is programmed to operate under control of an operating system, such as the IBM VM/ESA system. The computer 1310 includes a level 0 storage facility 1311, such as a main memory to store data for immediate access by one or more executing programs. A file system 1312 is included in the operating system and may comprise, for example, a file system such as the IBM shared file system. The file system (FS) 1312 provides an interface through which a user can access and use data in file form. The FS 1312 includes the three functions described above, including FILEPOOL BACKUP 1315, FILEPOOL RESTORE 1316, and FILEPOOL FILELOAD 1318. A storage management subsystem (SMS) 1314 is also provided and may comprise, for example, the IBM DFSMS/VM. The SMS 1314 includes the four functions described above: a migration-level 2(ML2) function 1320, a backup ML2 storage group function 1322 which is tied by a function call to FILEPOOL BACKUP 1315, a restore ML2 storage group function 1324 which is tied by a function call to FILEPOOL RESTORE 1316, and a restore ML2 file process 1326 which is coupled by a function call to FILEPOOL FILELOAD function 1318. The three functions 1315, 1316 and 1318 correspond to functions which are currently provided in the IBM shared file system. SMS 1314 has access to at least one backup/migration inventory 1328 having the form and function described above. In conformance with the invention, the inventory 1328 includes a plurality of function entries such as a backup entry 1330, a migrate entry 1332, and a data object entry 1334. As with the description of the efficient embodiment of the invention given above, a single data object entry 1334 which locates a single repository file 1349 in an auxiliary storage device such as the device 1350 can be referenced by one or more inventory function entries, such as the entries 1330 and 1332. In this manner, the single repository file 1349 stored in the auxiliary storage device 1350 and pointed to by the data object entry 1334 can serve one or more auxiliary storage purposes such as migration, backup and archive. For migration and recall, the ML2 process 1320 obtains access to the repository file by way of 1332/1334, while file system functions, such as backup, may access the repository file by way of 1330/1334.

In practice, the invention would operate by activating a file stored, for example, in a track 1362 of a disk 1361 contained in a direct access storage device (DASD) 1360. The file may be activated, for updating for example, by bringing portions of the file by conventional means and processes to the main memory of the computer 1310, writing updates to those portions and returning the updated portions to the file in the DASD 1360. The file may lapse into inactivity and be migrated from its primary storage level at 1360 to auxiliary storage tape location 1349 by way of the tape drive 1350. Migration would result in creation of the migrate and DOB entries 1332 and 1334. Later, at user election, or program means, the file may be backed up by placement of the backup entry 1330 into the inventory 1328. Later, the file may be recalled and/or recovered from the auxiliary storage location 1349 by being brought back to the primary storage level 1 360 or the main memory.

Preferably, the invention comprises an executable computer program which may be written in a high-level computer language without undue experimentation from the descriptions given above, and installed, compiled, and executed on a computer. Refer to FIG. 14 for an understanding of this aspect of the invention where initially, the invention consists of a sequence of executable software commands comprising a portion of a storage management system and associated file system, which may be placed on a transportable magnetic storage medium such as a magnetic tape 1410, and by way of a tape drive 1411 installed, compiled, and stored conventionally in a computer 1420. Given modern computer architecture and storage system structures, the inventors contemplate that the installed, compiled form of the invention would reside in executable machine language form on a disk such as the disk 1430 in a direct access storage device 1440 for access by the operating system 1450 of the computer 1420. Preferably, the computer 1420 can comprise any one of the IBM System 370/ESA models, or equivalent, programmed with the VM/ESA operating system, or equivalent, and executing the storage management system and file system of the DFSMS/VM and SFS types described above.

A number of specific embodiments of the present invention have been described. Nevertheless, it will be understood that various modifications and changes may be made without departing from the spirit and scope of the invention. The principal modification contemplated by the inventors is to extend the invention to cover more auxiliary storage functions than migration and backup and more auxiliary storage devices than tape. The obvious extension is to archiving, although this is not intended to limit the application of the described invention.

We claim:

1. In a computer system with at least one data processor and a hierarchically organized data storage system having at least a first, relatively high level data storage facility connected to the data processor for storing data for access by the data processor, and a second, relatively low level data storage facility connected to the data processor for storing repository versions of the data to support an auxiliary storage function including at least one of the backup, archival, and migration of the data, a computer-executable method for storing data in the low level data storage facility, the method comprising the steps of:

providing a single inventory describing the contents of the low level data storage facility for all of the auxiliary storage functions;

generating a repository version of the data to support a first auxiliary storage function and storing the repository version in the low level data storage facility; and creating and entering in the single inventory a first entry for the repository version, the first entry including:

an object identifier portion indicating a storage location in the low level data storage facility where the repository version is stored; and a function entry portion identifying the repository version, the first auxiliary storage function, and the object portion.

2. The method of claim 1 further including the step of creating and entering into the single inventory a second entry for the repository version, the second entry including a function portion identifying the data, a second auxiliary storage function, and the object portion.

3. The method of claim 1 wherein the step of storing the repository version further includes the step of storing the repository version on a data storage medium which is removable from the low level data storage facility.

4. In a computer system with at least one data processor and a hierachrically organized data storage system having at least a first, relatively high level of data storage connected to the data processor and a second, relatively low level of data storage connected to the data processor, a method for storing data, the method comprising the computer-executable steps of:

maintaining a single inventory describing the contents of the second level of data storage;

storing a first version of data in the first level of data storage for access by the at least one data processor;

creating one or more second versions of the data from the first version for a repository function including migration, backup or archiving of the first version and storing the one or more second versions in the second level of data storage;

creating one or more data object identifiers, each uniquely identifying a respective second version of the data created from the first version, identifying the repository function for the one or more second version, and indicating a storage location in the second level of data storage where the second version is stored; and entering the one or more data object identifiers in the single inventory.

5. A method for storing data as set forth in claim 4 wherein the step of storing the one or more second versions further includes the step of storing data on a data storage medium which is removable from the second level of data storage.

6. A system for storing data, comprising:

a hierarchically organized data storage facility having at least a first, relatively high level data storage apparatus and a second, relatively low level data storage apparatus;

data processor means connected to the data storage facility for processing a primary version of data in the first level data storage apparatus; wherein the data processor means is connected to the second level data storage apparatus and includes storage management means for generating second versions of data stored in the first level data storage apparatus in order to migrate, backup and archive the data; and single inventory means connected to the storage management means for specifying for each second version stored in the second data storage apparatus a storage location where the version is stored and one or more functions for which the second version is stored, such functions including one or more of migration, backup and archiving.

7. An apparatus for storing data comprising:

data processor means for processing data;

a hierarchically organized data storage system having at least a first, relatively high level data storage apparatus connected to the data processor means and a second, relatively low level data storage apparatus connected to the data processor means for storing a secondary version of data having a secondary storage purpose comprising at least one of the backup, archival, and migration of data;

a primary version of data stored in the first storage apparatus for access by the at least one data processor;

a secondary version of data created from the primary version;

a single inventory listing all data stored in the second storage apparatus;

a data object identifier uniquely identifying the secondary version; and one or more inventory entries for the secondary version, each of said one or more inventory entries including the data object identifier, specifying one or more secondary storage functions applied to the secondary version, and specifying one or more second data storage apparatus locations where the secondary version is stored.

8. A data storage management system, including:

backup means for copying data to a data storage medium to create a backup version of the data;

archive means for copying the data to a data storage medium to create an archive version of the data;

migration means for moving the data to a data storage medium to create a migrated version of the data; and single inventory means connected to the backup means, the archive means, and the migration means for:

retaining a data storage medium storage location of at least one of the backup, archive, and migrated versions of the data; and indicating storage of one of the backup, archive, and migrated versions of the data for one or more of the functions of backup, archive and migration of the data.

9. The data storage management system of claim 8, wherein the single inventory means retains only a single storage medium location of only one of the backup, archive, or migration versions of the data.

10. The data storage management system of claim 8 wherein the single inventory means retains any of the storage medium locations for the backup, archive, or migration versions of the data.

11. A method for storing data in a hierarchical data storage system including an auxiliary storage facility in which data is stored for auxiliary storage purposes including migration, backup, and archiving, the method including the computer-executed steps of:

maintaining a single auxiliary storage inventory describing the contents of the auxiliary storage facility;

generating a version of data for a first auxiliary storage function;

storing the version at an auxiliary storage location in an auxiliary storage medium;

generating a first inventory entry for the version, which includes:

a first object portion identifying the data and the auxiliary storage location; and a second object portion identifying the data, the first object portion, and the first auxiliary storage function;

entering the first inventory entry into the auxiliary storage inventory;

generating a second inventory entry for the version, which includes a third object portion identifying the data, the first object portion, and a second auxiliary storage function; and entering the second inventory entry into the auxiliary storage inventory.

12. The method of claim 11, including:

providing a request for the version of data for the first auxiliary storage purpose, the request including identification of the data;

locating the second object portion in the auxiliary storage inventory in response to the request, and retrieving a copy of the version from the auxiliary storage location in response to identification of the data; and deleting the second object portion from the auxiliary storage facility.

13. The method of claim 12, including:

providing a request for the version of data for the second auxiliary storage function, the request including identification of the data;

locating the third object portion in the auxiliary storage inventory in response to the request, and retrieving a copy of the version in response to identification of the data; and deleting the third object portion from the auxiliary storage facility.

14. The method of claim 13, further including the step of deleting the first object portion from the auxiliary storage inventory.

15. The method of claim 11, including:

providing a request for the version of data for the second auxiliary storage function, the request including identification of the data;

locating the third object portion in the auxiliary storage inventory in response to the request, and retrieving a copy of the version in response to identification of the data; and deleting the third object portion from the auxiliary storage facility.

16. The method of claim 15, including:

providing a request for the version of data for the first auxiliary storage function, the request including identification of the data;

locating the second object portion in the auxiliary storage inventory in response to the request, and retrieving a copy of the version from the auxiliary storage location in response to identification of the data; and deleting the second object portion from the auxiliary storage facility.

17. The method of claim 16, further including the step of deleting the first object portion from the auxiliary storage inventory.

* * * * *

UNITED STATES PATENT AND TRADEMARK OFFICE
CERTIFICATE OF CORRECTION

PATENT NO. : 5,475,834
DATED : December 12, 1995
INVENTOR(S) : Anglin et al.

It is certified that error appears in the above-indentified patent and that said Letters Patent is hereby corrected as shown below:

column 19, line 31, delete "at least one" and insert --means-- following "data processor".

Signed and Sealed this

Thirteenth Day of August, 1996

Attest:

BRUCE LEHMAN

*Attesting Officer*  *Commissioner of Patents and Trademarks*